United States Patent
Hashimoto et al.

(10) Patent No.: US 11,840,245 B2
(45) Date of Patent: Dec. 12, 2023

(54) VEHICLE CONTROL DATA GENERATION METHOD, VEHICLE CONTROLLER, VEHICLE CONTROL SYSTEM, VEHICLE LEARNING DEVICE, VEHICLE CONTROL DATA GENERATION DEVICE, AND MEMORY MEDIUM

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 454 days.

(21) Appl. No.: 17/128,822

(22) Filed: Dec. 21, 2020

(65) Prior Publication Data
US 2021/0213966 A1 Jul. 15, 2021

(30) Foreign Application Priority Data
Jan. 9, 2020 (JP) ................. 2020-002032

(51) Int. Cl.
*B60W 50/06* (2006.01)
*B60W 40/12* (2012.01)
*B60W 50/00* (2006.01)

(52) U.S. Cl.
CPC ............ *B60W 50/06* (2013.01); *B60W 40/12* (2013.01); *B60W 2050/0088* (2013.01); *B60W 2510/06* (2013.01); *B60W 2540/10* (2013.01)

(58) Field of Classification Search
CPC .... B60W 50/66; B60W 50/082; B60W 50/05; B60W 40/12; B60W 2050/088;
(Continued)

(56) References Cited

U.S. PATENT DOCUMENTS 5,410,477 A   4/1995   Ishii et al.
5,532,929 A   7/1996   Hattori et al.
(Continued)

FOREIGN PATENT DOCUMENTS

CN   114270367 A   4/2022
JP   4-293626 A    10/1992
(Continued)

OTHER PUBLICATIONS

Office Action dated Jul. 26, 2022 in co-pending U.S. Appl. No. 16/948,973, citing documents 6 and 9 through 12 therein, 12 pages
(Continued)

*Primary Examiner* — George C Jin
(74) *Attorney, Agent, or Firm* — Oblon, McClelland, Maier & Neustadt, L.L.P.

(57) ABSTRACT

A vehicle control data generation method is provided. A preference variable indicates a relative preference of a user for two or more requested elements that include at least two of three requested elements including a requested element indicating a high acceleration response of a vehicle, a requested element indicating at least one of vibration and noise of the vehicle is small, and a requested element indicating a high energy use efficiency. The reward calculating process includes a changing process that changes a reward provided when a characteristic of the vehicle is a predetermined characteristic in a case where a value of the preference variable is a second value such that the changed reward differs from the reward provided when the characteristic is the predetermined characteristic in a case where the value of the preference variable is a first value.

9 Claims, 12 Drawing Sheets

(58) Field of Classification Search
CPC ......... B60W 2510/06; B60W 2540/10; B60W 2520/10; B60W 2540/16; B60W 2710/0605; B60W 2710/0644; B60W 2710/1005; B60W 30/182
See application file for complete search history.

(56) References Cited

U.S. PATENT DOCUMENTS

| | | |
|---|---|---|
| 6,549,815 B1 | 4/2003 | Kaji |
| 6,837,217 B1 | 1/2005 | Hoshino et al. |
| 11,248,553 B2 | 2/2022 | Hashimoto et al. |
| 11,313,309 B2 | 4/2022 | Hashimoto et al. |
| 2002/0157639 A1 | 10/2002 | Kidokoro et al. |
| 2003/0055551 A1 | 3/2003 | Weber et al. |
| 2004/0098197 A1 | 5/2004 | Matsumoto et al. |
| 2010/0106603 A1 | 4/2010 | Dey et al. |
| 2010/0204899 A1 | 8/2010 | Serres |
| 2012/0117011 A1 | 5/2012 | Hashimoto et al. |
| 2018/0066593 A1 | 3/2018 | Uezono et al. |
| 2018/0072317 A1 | 3/2018 | Hiwatashi et al. |
| 2018/0086349 A1 | 3/2018 | Hiwatashi et al. |
| 2019/0242319 A1 | 8/2019 | Matsumoto et al. |
| 2019/0360421 A1 | 11/2019 | Cancellieri. et al. |
| 2020/0031371 A1* | 1/2020 | Soliman ............... B60W 10/04 |
| 2020/0062262 A1 | 2/2020 | Kusari et al. |
| 2020/0263581 A1 | 8/2020 | Muto et al. |
| 2020/0263618 A1 | 8/2020 | Muto et al. |
| 2021/0033039 A1 | 2/2021 | Hashimoto et al. |
| 2021/0056781 A1 | 2/2021 | Hashimoto et al. |
| 2021/0094587 A1 | 4/2021 | Pilly et al. |
| 2021/0114581 A1 | 4/2021 | Hashimoto et al. |
| 2021/0114596 A1 | 4/2021 | Hashimoto et al. |
| 2021/0114608 A1 | 4/2021 | Hashimoto et al. |
| 2021/0115870 A1 | 4/2021 | Hashimoto et al. |
| 2021/0115871 A1 | 4/2021 | Hashimoto et al. |
| 2021/0188276 A1 | 6/2021 | Hashimoto et al. |
| 2021/0213963 A1* | 7/2021 | Hashimoto ......... F02D 41/2448 |
| 2021/0213966 A1* | 7/2021 | Hashimoto ........... B60W 50/06 |
| 2021/0213975 A1 | 7/2021 | Hashimoto. et al. |
| 2021/0254571 A1* | 8/2021 | Hashimoto ......... F02D 41/2438 |
| 2021/0341886 A1* | 11/2021 | Liu ........................ G06N 5/022 |

FOREIGN PATENT DOCUMENTS

| | | |
|---|---|---|
| JP | 6-248997 A | 9/1994 |
| JP | 10-254505 A | 9/1998 |
| JP | 2000-250604 A | 9/2000 |
| JP | 2004-257434 A | 9/2004 |
| JP | 2 286 958 A1 | 12/2007 |
| JP | 2009-19523 A | 1/2009 |
| JP | 2009-167968 A | 7/2009 |
| JP | 2016-6327 A | 1/2016 |
| JP | 2016-169686 A | 9/2016 |
| JP | 2019-519851 A | 7/2019 |
| JP | 6547991 B1 | 7/2019 |
| JP | 6547992 B1 | 7/2019 |
| JP | 2019-144748 A | 8/2019 |
| PA | 6590097 B1 | 10/2019 |
| WO | WO 2018/084324 A1 | 5/2018 |
| WO | WO 2018/105703 A1 | 6/2018 |

OTHER PUBLICATIONS

Notice of Allowance dated Nov. 30, 2022, in U.S. Appl. No. 16/948,973.
Office Action dated Jul. 19, 2021 in co-pending U.S. Appl. No. 17/063,203, citing documents 1 through 12 therein, 9 pages
Notice of Allowance dated Oct. 19, 2021 in co-pending U.S. Appl. No. 17/063,203, 9 pages.
Office Action dated Jun. 24, 2021 in co-pending U.S. Appl. No. 17/066,862, citing documents 9 through 12 therein, 8 pages.
Final Office Action dated Dec. 8, 2021 in co-pending U.S. Appl. No. 17/066,862, 7 pages.
Notice of Allowance dated Feb. 16, 2022 in co-pending U.S. Appl. No. 17/066,862, 8 pages.
Office Action dated Sep. 28, 2022 in co-pending U.S. Appl. No. 16/950,242, citing document 15 therein, 16 pages
Notice of Allowance dated Feb. 3, 2023 in U.S. Appl. No. 16/950,242.
Corrected Notice of Allowability dated Feb. 1, 2023 in U.S. Appl. No. 16/948,973. (4 pages).
Corrected Notice of Allowability dated Feb. 15, 2023, in U.S. Appl. No. 16/950,242, 3 pages.
Notice of Allowability dated Mar. 8, 2023 in U.S. Appl. No. 16/948,973 (3 pages).
Corrected Notice of Allowability dated Mar. 20, 2023 in U.S. Appl. No. 16/948,973 (4 pages).
Office Action issued in related U.S. Appl. No. 17/120,936 dated Jun. 21, 2023 (41 pages).

* cited by examiner

VEHICLE CONTROL DATA GENERATION METHOD, VEHICLE CONTROLLER, VEHICLE CONTROL SYSTEM, VEHICLE LEARNING DEVICE, VEHICLE CONTROL DATA GENERATION DEVICE, AND MEMORY MEDIUM

BACKGROUND

1. Field

The present disclosure relates to a vehicle control data generation method, a vehicle controller, a vehicle control system, a vehicle learning device.

2. Description of Related Art

For example, Japanese Laid-Open Patent Publication No. 2016-6327 discloses a controller that controls a throttle valve, which is an operated unit of an internal combustion engine mounted on a vehicle, based on a value processing an operation amount of an accelerator pedal with a filter.

The above-described filter is required to set the operation amount of the throttle valve of the internal combustion engine mounted on the vehicle to an appropriate operation amount in accordance with the operation amount of the accelerator pedal. Thus, adaptation of the filter requires a great number of man-hours by skilled workers.

In this manner, adaptation of operation amounts of electronic devices on a vehicle in accordance with the state of the vehicle requires a great number of man-hours by skilled workers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1: A vehicle control data generation method is provided. The generation method includes obtaining, by an execution device with relationship defining data stored in a memory device, a preference variable and a state of a vehicle that is based on a detection value of a sensor, the preference variable indicating a relative preference of a user for two or more requested elements, operating, the relationship defining data defining a relationship between the state of the vehicle and an action variable related to an operation of an electronic device in the vehicle, by the execution device with the relationship defining data stored in the memory device, the electronic device, providing, by the execution device with the relationship defining data stored in the memory device, based on the obtained state of the vehicle, a greater reward when a characteristic of the vehicle meets a standard than when the characteristic of the vehicle does not meet the standard, and updating, by the execution device with the relationship defining data stored in the memory device, the relationship defining data by inputting, to a predetermined update map, the obtained state of the vehicle, the value of the action variable used to operate the electronic device, and the reward corresponding to the operation of the electronic device. The update map outputs the updated relationship defining data so as to increase an expected return for the reward in a case where the electronic device is operated in accordance with the relationship defining data. The two or more requested elements include at least two of three requested elements, the three requested elements including a requested element indicating a high acceleration response of the vehicle, a requested element indicating that at least one of vibration or noise of the vehicle is small, and a requested element indicating a high energy use efficiency. The providing the reward includes changing a reward that is provided when a characteristic of the vehicle is a predetermined characteristic in a case where the value of the preference variable is a second value such that the changed reward differs from the reward that is provided when the characteristic of the vehicle is the predetermined characteristic in a case where the value of the preference variable is a first value.

In the above-described method, by calculating the reward that results from the operation of the electronic device, it is possible to understand what kind of reward is obtained by the operation. Further, the reward is used to update the relationship defining data with the update map according to reinforcement learning. This sets the relationship between the state of the vehicle and the action variable to be appropriate. Accordingly, the man-hours by skilled workers are reduced when the relationship between the state of the vehicle and the action variable is set to be appropriate.

Particularly, in the above-described method, the manner of providing a reward is changed depending on the preference variable. Thus, the relationship defining data that satisfies a relative preference in the two or more requested elements is learned through reinforcement learning.

Aspect 2: In the vehicle control data generation method according to Aspect 1, the vehicle includes an internal combustion engine, and the two or more requested elements that indicate the relative preference depending on the preference variable include, instead of the at least two of the three requested elements, at least two requested elements of four requested elements, the four requested elements including a requested element indicating a low concentration of a predetermined component in exhaust gas of the internal combustion engine and the three requested elements.

Aspect 3: The vehicle control data generation method according to Aspect 1 or 2 further includes generating, by the execution device, based on the updated relationship defining data, control mapping data by associating the state of the vehicle with a value of the action variable that maximizes the expected return, and the state of the vehicle is input to the control mapping data, which outputs the value of the action variable that maximizes the expected return.

In the above-described method, the control mapping data is generated based on the relationship defining data that has been learned through reinforcement learning. The control mapping data can be implemented in the controller. This allows the value of the action variable that maximizes the expected return to be easily set based on the state of the vehicle and the action variable.

Aspect 4: A vehicle controller is provided that includes the memory device and the execution device in the vehicle control data generation method according to any one of Aspects 1 to 3. The operating the electronic device includes operating, based on the relationship defining data, the electronic device in accordance with a value of the action variable corresponding to the state of vehicle, and the obtaining the preference variable includes obtaining, as the preference variable, the relative preference of the user for the at least two requested elements.

In the above-described configuration, the value of the action variable is set based on the relationship defining data that has been learned through reinforcement learning. The electronic device is operated based on the set value of the action variable. This allows the electronic device to be operated such that the expected return increases.

Aspect 5: A vehicle control system is provided that includes the execution device and the memory device in the vehicle controller according to Aspect 4. The execution device includes a first execution device mounted on the vehicle and a second execution device that is an out-of-vehicle device, the first execution device is configured to execute at least the obtaining the state of the vehicle and the preference variable and the operating the electronic device, and the second execution device is configured to execute at least the updating the relationship defining data.

In the above-described configuration, the update process is executed by the second execution device. Thus, the computation load on the first execution device is reduced as compared with when the update process is executed by the first execution device.

The phrase "second execution device that is an out-of-vehicle device" means that the second execution device is not an in-vehicle device.

Aspect 6: A vehicle controller is provided that includes the first execution device in the vehicle control system according to Aspect 5.

Aspect 7: A vehicle learning device is provided that includes the second execution device in the vehicle control system according to Aspect 5.

Aspect 8: A vehicle controller is provided that includes the execution device and the memory device that execute various processes according to any one of Aspects 1 to 3.

Aspect 9: A computer readable storage medium is provided that stores a vehicle control data generation process that causes the execution device to perform various processes according to any one of Aspects 1 to 3 is provided.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle control data generation method, a vehicle controller, a vehicle control system, a vehicle learning device according to each of the embodiments will now be described with reference to the drawings.

First Embodiment

Figure 1:
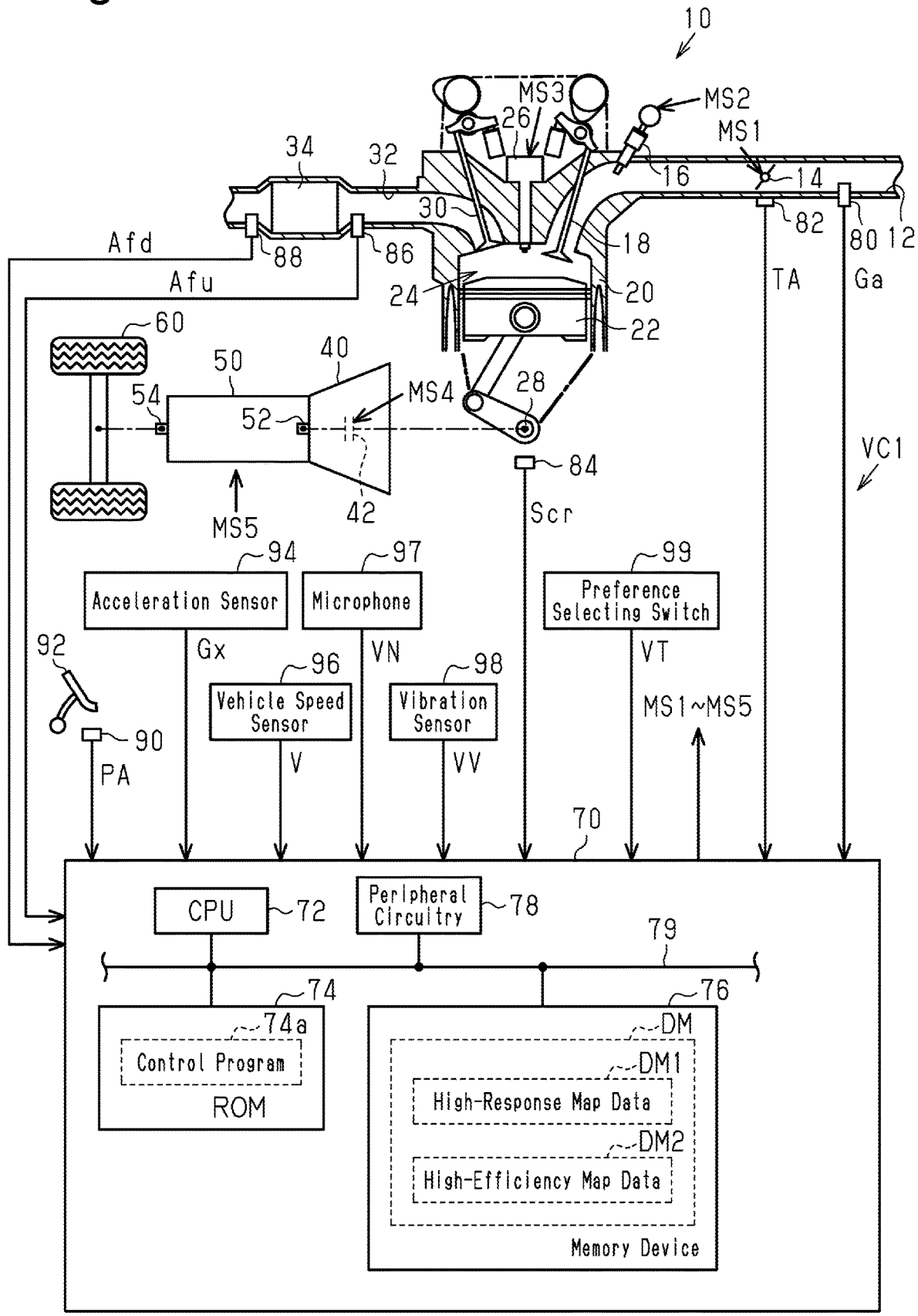
FIG. 1 is a diagram showing a controller and a drive system according to a first embodiment of the present disclosure.

The first embodiment will now be described with reference to FIGS. 1 to 6. FIG. 1 shows the configuration of a drive system of a vehicle VC1 and the controller 70 according to the present embodiment.

As shown in FIG. 1, an internal combustion engine 10 includes an intake passage 12, in which a throttle valve 14 and a fuel injection valve 16 are arranged in that order from the upstream side. Air drawn into the intake passage 12 and fuel injected from the fuel injection valve 16 flow into a combustion chamber 24, which is defined by a cylinder 20 and a piston 22, when an intake valve 18 is opened. In the combustion chamber 24, air-fuel mixture is burned by spark discharge of an ignition device 26. The energy generated by the combustion is converted into rotational energy of a crankshaft 28 via the piston 22. The burned air-fuel mixture is discharged to an exhaust passage 32 as exhaust gas when an exhaust valve 30 is opened. The exhaust passage 32 incorporates a catalyst 34, which is an aftertreatment device for purifying exhaust gas.

The crankshaft 28 is mechanically couplable to an input shaft 52 of a transmission 50 via a torque converter 40 equipped with a lockup clutch 42. The transmission 50 variably sets the gear ratio, which is the ratio of the rotation speed of the input shaft 52 and the rotation speed of an output shaft 54. The output shaft 54 is mechanically coupled to driven wheels 60.

The controller 70 controls the internal combustion engine 10 and operates operated units of the engine 10 such as the throttle valve 14, the fuel injection valve 16, and the ignition device 26, thereby controlling the torque and the ratios of exhaust components, which are controlled variables of the internal combustion engine 10. The controller 70 also controls the torque converter 40 and operates the lockup clutch 42 to control the engagement state of the lockup clutch 42. Further, the controller 70 controls and operates the transmission 50, thereby controlling the gear ratio, which is the controlled variable of the transmission 50. FIG. 1 shows operation signals MS1 to MS5 respectively corresponding to the throttle valve 14, the fuel injection valve 16, the ignition device 26, the lockup clutch 42, and the transmission 50.

To control the controlled variables, the controller 70 refers to an intake air amount Ga detected by an air flow meter 80, an opening degree of the throttle valve 14 detected by a throttle sensor 82 (throttle opening degree TA), and an output signal Scr of a crank angle sensor 84. Further, the controller 70 refers to an upstream detection value Afu detected by an upstream air-fuel ratio sensor 86, which is arranged upstream of the catalyst 34, a downstream detection value Afd detected by a downstream air-fuel ratio sensor 88, which is arranged downstream of the catalyst 34, and a depression amount (accelerator operation amount PA) of an accelerator pedal 92, which is detected by an acceleration sensor 94. Furthermore, the controller 70 refers to an acceleration Gx of the vehicle VC1 in the front-rear direction, which is detected by an acceleration sensor 94, and a vehicle speed V, which is detected by a vehicle speed sensor 96. Additionally, the controller 70 refers to a noise intensity VN, which is detected by a microphone 97, and a vibration intensity VV, which is detected by a vibration sensor 98. The CPU 72 refers to the value of a preference variable VT, which indicates the preference of a user and is instructed by the operation of a preference selecting switch 99. In the present embodiment, the preference variable VT indicates one of two requested elements that the user wants to relatively prioritize, namely, a requested element indicating a high acceleration response and a requested element indicating a high energy use efficiency.

The controller 70 includes a CPU 72, a ROM 74, a nonvolatile memory that can be electrically rewritten (memory device 76), and peripheral circuitry 78, which can communicate with one another through a local network 79. The peripheral circuitry 78 includes a circuit that generates a clock signal regulating internal operations, a power supply circuit, and a reset circuit.

The ROM 74 stores a control program 74*a*. The memory device 76 stores map data DM. In the map data DM, the time-series data of the current gear ratio GR, the vehicle speed V, and the accelerator operation amount PA are used as input variables, and a command value of the throttle opening degree TA (throttle command value TA*) and a command value of the gear ratio GR (gear ratio command value GR*) are used as output variables. The map data DM includes a high-response map data DM1 and a high-efficiency map data DM2. The map data refers to a data set of discrete values of the input variable and values of the output variable each corresponding to a value of the input variable.

Figure 2:
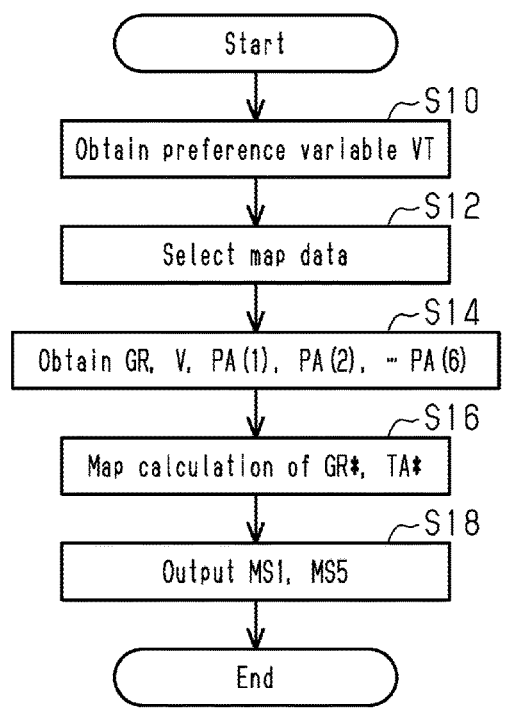
FIG. 2 is a flowchart showing a procedure of processes executed by the controller according to the first embodiment.

FIG. 2 shows a procedure of processes executed by the controller 70 of the present embodiment. The processes shown in FIG. 2 are executed by the CPU 72 repeatedly executing programs stored in the ROM 74, for example, at predetermined intervals. In the following description, the number of each step is represented by the letter S followed by a numeral.

In the series of processes shown in FIG. 2, the CPU 72 first acquires the preference variable VT (S10). In correspondence with the value of the preference variable VT, the CPU 72 selects one of the high-response map data DM1 and the high-efficiency map data DM2 (S12). That is, the CPU 72 selects the high-response map data DM1 when the value of the preference variable VT indicates that the relative priority of the requested element indicating a high acceleration response is high, and the CPU 72 selects the high-efficiency map data DM2 when the value of the preference variable VT indicates that the relative priority is not high.

Next, the CPU 72 acquires time-series data including six sampled values PA(1), PA(2), . . . PA(6) of the accelerator operation amount PA, the current gear ratio GR, and the vehicle speed V (S14). The sampled values included in the time-series data have been sampled at different points in time. In the present embodiment, the time-series data includes six sampled values that are consecutive in time in a case in which the values are sampled at a constant sample period.

Then, the CPU 72 uses the map data selected by the process of S12 to perform map calculation of the throttle command value TA* and the gear ratio command value GR* (S16). When the value of an input variable matches any of the values of the input variables on the map data, the map calculation uses the value of the corresponding output variable on the map data. When the value of the input variable does not match any of the values of the input variables on the map data, the map calculation uses a value obtained by interpolation of multiple values of the output variable included in the map data as the calculation result.

Then, the CPU 72 outputs the operation signal MS1 to the throttle valve 14, thereby controlling the throttle opening degree TA, and outputs the operation signal MS5 to the transmission 50, thereby operating the gear ratio (S18). The present embodiment illustrates an example in which the throttle opening degree TA is feedback-controlled to the throttle command value TA*. Thus, even if the throttle command value TA* remains the same value, the operation signal MS1 may have different values.

When the process of step S18 is completed, the CPU 72 temporarily suspends the series of processes shown in FIG. 2.

Figure 3:
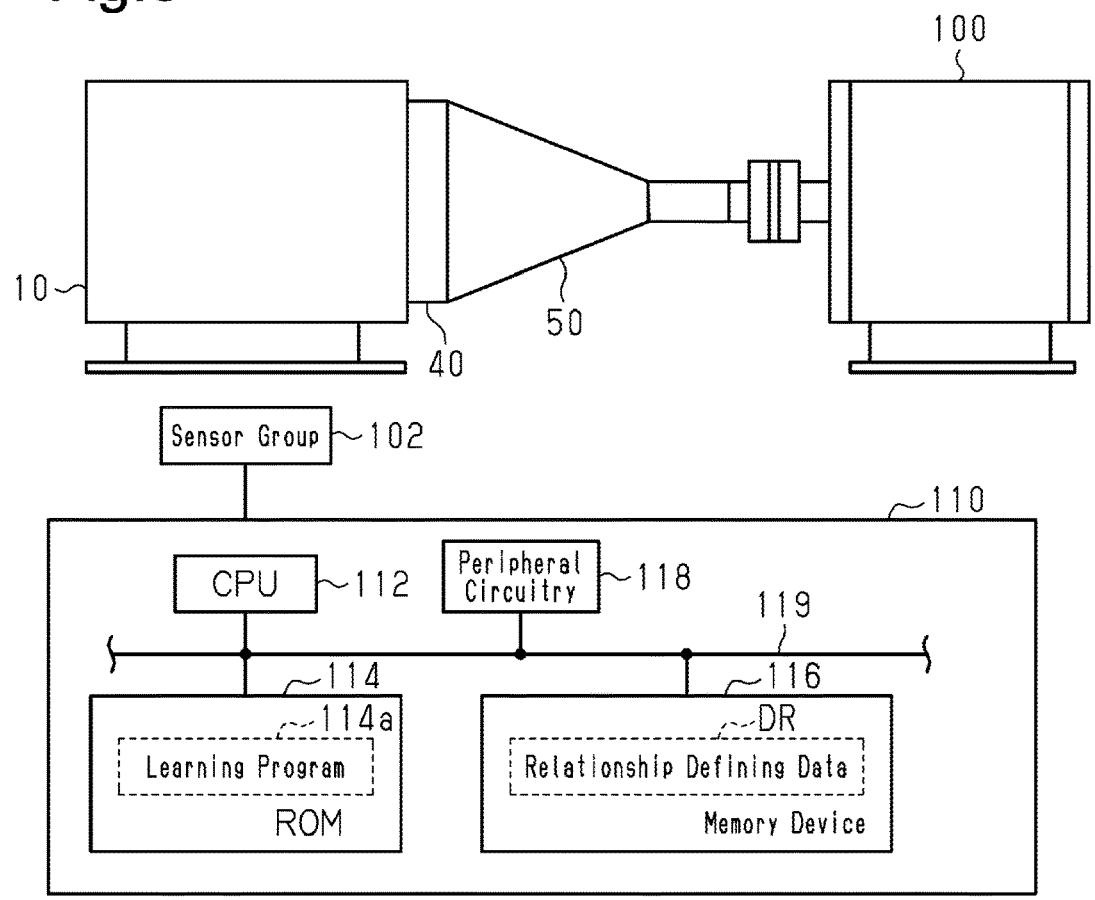
FIG. 3 is a diagram showing a system that generates map data according to the first embodiment.

FIG. 3 shows a system that generates the map data DM.

As shown in FIG. 3, in the present embodiment, the crankshaft 28 of the internal combustion engine 10 is mechanically coupled to a dynamometer 100 via the torque converter 40 and the transmission 50. Various state variables obtained by operating the internal combustion engine 10 are detected by a sensor group 102, and the detection results are input to a generation device 110. The generation device 110 is a computer that generates the map data DM. The sensor group 102 includes the sensors and the like installed in the vehicle VC1 in FIG. 1.

The generation device 110 includes a CPU 112, a ROM 114, a nonvolatile memory that can be electrically rewritten (memory device 116), and peripheral circuitry 118. These components can communicate with each other through a local network 119. The memory device 116 stores relationship defining data DR, which defines the relationship between a state variable and an action variable. That is, the relationship defining data DR defines the relationship between the time-series data of the accelerator operation amount PA, the vehicle speed V, and the gear ratio command value GR*, which serve as the state variables, and the throttle command value TA* and gear ratio command value GR*, which serve as the action variables. The ROM 114 stores a learning program 114*a*, which learns the relationship defining data DR through reinforcement learning.

Figure 4:
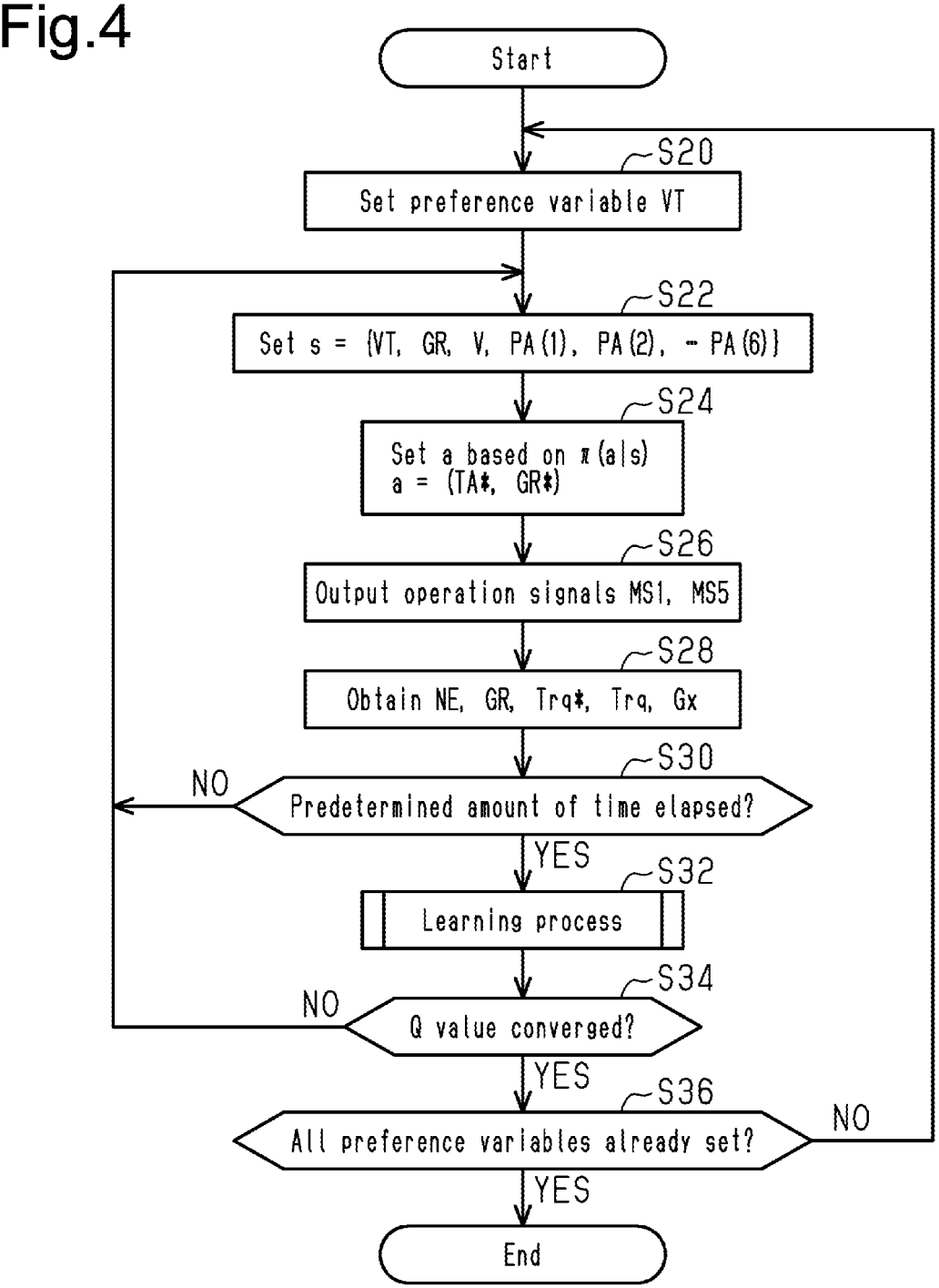
FIG. 4 is a flowchart showing a procedure of processes executed by the system according to the first embodiment.

FIG. 4 shows a procedure for processes executed by the generation device 110. The process shown in FIG. 4 is implemented by the CPU 112 executing the learning program 114a stored in the ROM 114.

In the series of processes shown in FIG. 4, the CPU 112 first sets the value of the preference variable VT (S20). With the internal combustion engine 10 running, the CPU 112 sets, as the state s, the time-series data of the accelerator operation amount PA, the current gear ratio GR, the vehicle speed V, and the preference variable VT (S22). Although the time-series data is the same as the data in the process of S14, the system shown in FIG. 3 does not include the accelerator pedal 92. It is thus assumed that the accelerator operation amount PA has been virtually generated by the generation device 110 simulating the state of the vehicle VC1, and the virtually-generated accelerator operation amount PA is regarded as a vehicle state that is based on the detection value of the sensor. Further, the vehicle speed V is calculated by the CPU 112 as a traveling speed of the vehicle under the hypothesis that the vehicle actually exists. In the present embodiment, this vehicle speed is regarded as the vehicle state that is based on the detection value of the sensor. Specifically, the CPU 112 uses the output signal Scr of the crank angle sensor 84 to calculate the rotation speed NE of the crankshaft 28 and uses the rotation speed NE and the gear ratio GR to calculate the vehicle speed V.

Next, in accordance with a policy π defined by the relationship defining data DR, the CPU 112 sets an action a, which corresponds to the state s obtained through the process of S22 and includes the throttle command value TA* and gear ratio command value GR* (S24).

In the present embodiment, the relationship defining data DR is used to define an action value function Q and the policy π. In the present embodiment, the action value function Q is a table-type function representing values of expected return in accordance with eight-dimensional independent variables of the state s and the action a. When a state s is provided, the action value function Q includes values of the action a at which the independent variable is the provided state s. Among these values, the one at which the expected return is maximized is referred to as a greedy action. The policy n defines rules with which the greedy action is preferentially selected, and an action a different from the greedy action is selected with a predetermined probability.

Specifically, the number of the values of the independent variable of the action value function Q according to the present embodiment is obtained by deleting a certain amount from all the possible combinations of the state s and the action a, referring to human knowledge and the like. For example, in time-series data of the accelerator operation amount PA, human operation of the accelerator pedal 92 would never create a situation in which one of two consecutive values is the minimum value of the accelerator operation amount PA and the other is the maximum value. Accordingly, the action value function Q is not defined for this combination of the values. In order for the gear ratio GR to avoid a sudden change from second gear to fourth gear, the gear ratio command value GR* serving as a possible action a is limited to first gear, second gear, and third gear when, for example, the current gear ratio GR is second gear. That is, when the gear ratio GR serving as the state s is second gear, the action a of fourth gear or higher is not defined. In the present embodiment, reduction of the dimensions based on human knowledge limits the number of the possible values of the independent variable defined by the action value function Q to a number less than or equal to 10 to the fifth power, and preferably, to a number less than or equal to 10 to the fourth power.

Next, in the same manner as the process of S18, the CPU 112 outputs the operation signals MS1, MS5 based on the set throttle command value TA* and gear ratio command value GR* (S26). Subsequently, the CPU 112 obtains the rotation speed NE, the gear ratio GR, a torque Trq of the internal combustion engine 10, the torque command value Trq* for the internal combustion engine 10, and the acceleration Gx (S28). In this step, the CPU 112 calculates the torque Trq based on the gear ratio GR and a load torque generated by the dynamometer 100. Further, the CPU 112 sets the torque command value Trq* in accordance with the accelerator operation amount PA and gear ratio GR. In this step, the gear ratio command value GR* is used as the action variable of reinforcement learning. Thus, the gear ratio command value GR* is not limited to a value that causes the torque command value Trq* to become less than or equal to the maximum torque achievable by the internal combustion engine 10. Accordingly, the torque command value Trq* is not limited to a value less than or equal to the maximum torque achievable by the internal combustion engine 10. Furthermore, the CPU 112 calculates the acceleration Gx based on, for example, the load torque generated by the dynamometer 100, as a value that is assumed to occur in a vehicle if the vehicle is hypothetically equipped with the internal combustion engine 10 and the like. That is, in the present embodiment, while the acceleration Gx is a virtual parameter, the acceleration Gx is regarded as the vehicle state that is based on the detection value of the sensor.

Next, the CPU 112 determines whether a predetermined period has elapsed from the later one of the point in time when the process of S20 was executed and the point in time when the process of S32 (described later) was executed (S30). Then, when determining that the predetermined period has elapsed (S30: YES), the CPU 112 updates the action value function Q through reinforcement learning (S32).

Figure 5:
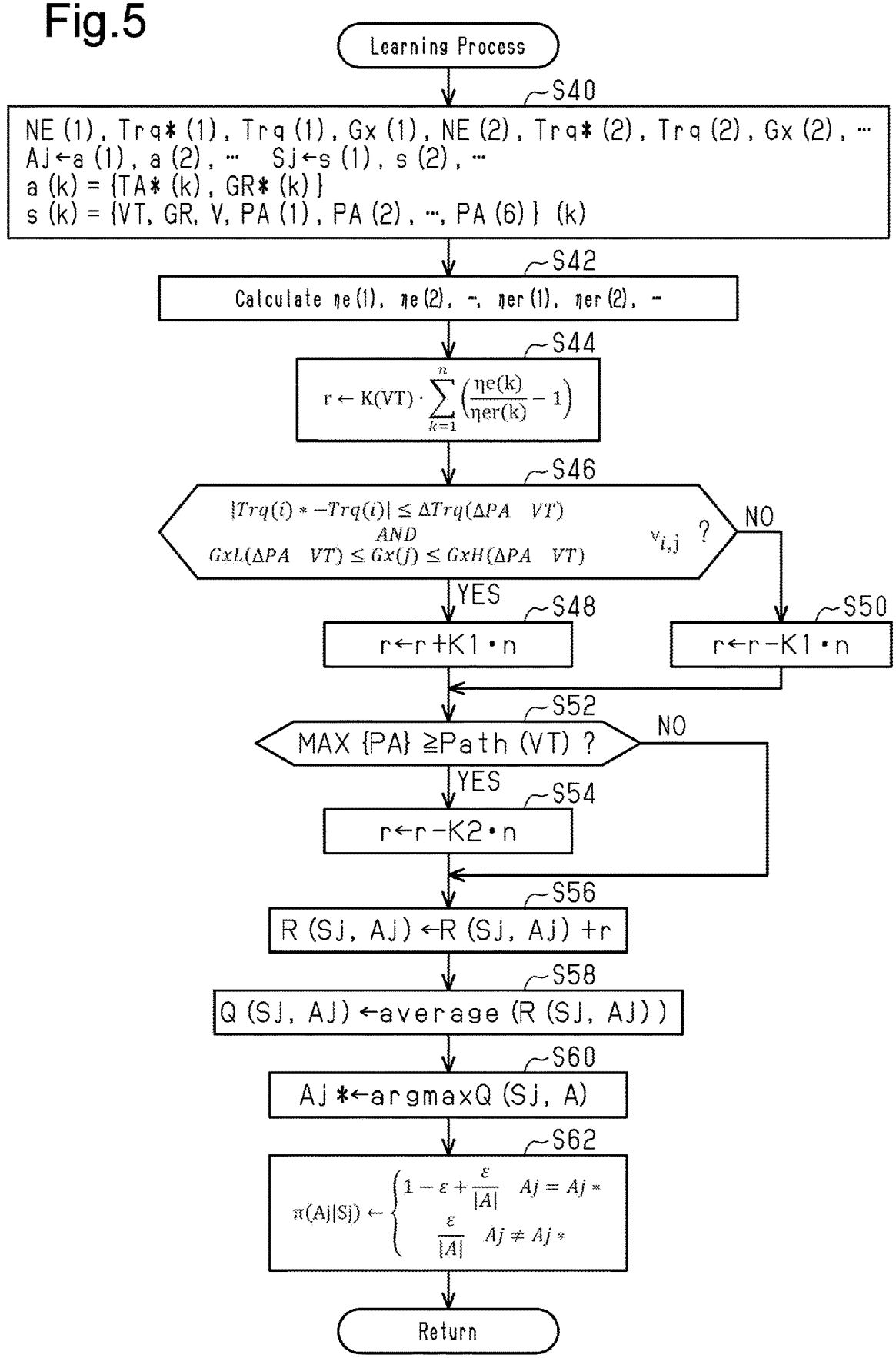
FIG. 5 is a flowchart illustrating the details of a learning process according to the first embodiment.

FIG. 5 illustrates the details of the process of S32.

In the series of processes shown in FIG. 5, the CPU 112 acquires time-series data including groups of four sampled values of the rotation speed NE, the torque command value Trq*, the torque Trq, and the acceleration Gx in the predetermined period and acquires the time-series data of the state s and the action a (S40). In FIG. 5, variables of which the numbers in parentheses are different are variables at different sampling points in time. For example, a torque command value Trq*(1) and a torque command value Trq*(2) have been obtained at different sampling points in time. The of the action a in the predetermined period is defined as an action set Aj, and the time-series data of the state s in the predetermined period is defined as a state set Sj.

Next, the CPU 112 uses the time-series data of the torque Trq and rotation speed NE to calculate the time-series data of an efficiency re of the internal combustion engine 10 and the time-series data of a reference efficiency ηer (S42). Specifically, the CPU 112 calculates the efficiency ηe(k) and the reference efficiency ηer of the internal combustion engine 10 based on the operating point determined by the torque Trq(k) and the rotation speed NE(k), where k is 1, 2, 3, . . . . The efficiency re is defined for each operating point of the internal combustion engine 10. The efficiency ne is a proportion that can be taken as power in the combustion energy that occurs when the air-fuel ratio of the air-fuel mixture in the combustion chamber 24 of the internal combustion engine 10 is set as a predetermined value and the ignition timing is set as a predetermined timing. The reference efficiency ηer is defined for each output of the internal combustion engine 10. The reference efficiency ηer is a value obtained by multiplying, by a predetermined coefficient that is smaller than 1, the maximum value of the proportion that can be taken as power in the combustion energy that occurs when the air-fuel ratio of the air-fuel mixture in the combustion chamber 24 of the internal combustion engine 10 is set as the predetermined value and the ignition timing is set as the predetermined timing. That is, the reference efficiency ηer is a value obtained by multiplying, by the predetermined coefficient, the proportion that can be taken as power in the combustion energy in the operating point where the proportion is the maximum. Specifically, for example, the CPU 112 performs map calculation of the efficiency ηe with the ROM 114 storing the map data in which the torque Trq and rotation speed NE are used as input variables and the efficiency ηe is used as an output variable. Specifically, for example, the CPU 112 performs map calculation of the reference efficiency ηer with the ROM 114 storing the output of the product of the map data in which the torque Trq and rotation speed NE are used as input variables and the reference efficiency Ter is used as an output variable.

Next, the CPU 112 assigns, to a reward r, a value obtained by multiplying, by a coefficient K, the integration value of a value obtained by subtracting 1 from a value obtained by dividing the efficiency ηe(k) by the reference efficiency ηer(k) (S44). This process causes the reward r to be larger when the efficiency ηe is greater than the reference efficiency ηer than when the efficiency ηe is less than the reference efficiency ηer.

The CPU 112 varies the coefficient Kin correspondence with the preference variable VT. Specifically, the CPU 112 sets the coefficient K to be larger when the preference variable VT indicates a high priority of the energy use efficiency than when the preference variable VT indicates a high priority of the acceleration response. This setting lowers the reference of the efficiency when a predetermined reward is assigned in a case where the priority of the energy use efficiency is high. That is, in the case where the priority of the energy use efficiency is high, the efficiency ηe is low when the same reward is obtained. Thus, when the operating point with a high efficiency ηe is selected, the reward r is larger when the priority of the energy use efficiency is high than when the priority of the acceleration response is high.

Next, the CPU 112 determines whether the logical conjunction is true of a condition (i) in which the absolute value of the difference between an arbitrary torque Trq and torque command value Trq* in the predetermined period is less than or equal to a specified amount ΔTrq and a condition (ii) in which acceleration Gx is greater than or equal to a lower limit GxL and less than or equal to an upper limit GxH (S46).

The CPU 112 varies the specified amount ΔTrq depending on a change amount per unit time APA of the accelerator operation amount PA at the start of the predetermined period and depending on the value of the preference variable VT. That is, the CPU 112 determines that the predetermined period is in a transient time if the absolute value of the change amount per unit time APA is great and sets the specified amount ΔTrq to a greater value than in a case in which the predetermined period is in a steady time. Further, the CPU 112 sets the specified amount ΔTrq to be larger when the priority of the energy use efficiency is high than when the priority of the acceleration response is high.

Further, the CPU 112 varies the lower limit GxL depending on the change amount ΔPA of the accelerator operation amount PA at the start of the predetermined period. That is, when the predetermined period is related to transient time and the change amount per unit time APA has a positive value, the CPU 112 sets the lower limit GxL to a greater value than in a case in which the predetermined period is related to steady time. When the predetermined period is related to transient time and the change amount per unit time APA has a negative value, the CPU 112 sets the lower limit GxL to a smaller value than in a case in which the predetermined period is related to steady time.

Further, the CPU 112 varies the upper limit GxH depending on the change amount per unit of time APA of the accelerator operation amount PA at the start of the predetermined period. That is, when the predetermined period is related to transient time and the change amount per unit time APA has a positive value, the CPU 112 sets the lower limit GxL to a smaller value than in a case in which the predetermined period is related to steady time. When the predetermined period is related to transient time and the change amount per unit time APA has a negative value, the CPU 112 sets the upper limit GxH to a smaller value than in a case in which the predetermined period is related to steady time.

Further, the CPU 112 varies the lower limit GxL and upper limit GxH in correspondence with the preference variable VT. Specifically, the CPU 112 sets the lower limit GxL and upper limit GxH such that the absolute value of the acceleration Gx during the transient time is greater when the priority of the acceleration response is high than when the priority of the energy use efficiency is high.

When determining that the logical conjunction of the condition (i) and the condition (ii) is true (S46: YES), the CPU 112 adds K1·N to the reward r (S48). When determining that the logical conjunction is false (S46: NO), the CPU 112 subtracts K1·N from the reward r (S50). Here, n refers to the number of samplings of the efficiency ηe in the predetermined period. The processes from S46 to S50 provide a greater reward when a standard related to acceleration response is met than when the standard is not met.

When the process of S48 or S50 is completed, the CPU 112 determines whether a condition (iii) is met in which the maximum value of the accelerator operation amount PA in the predetermined period is greater than or equal to a threshold value PAth (S52). The CPU 112 sets the threshold value PAth to be larger when the priority of the energy use efficiency is high than when the priority of the acceleration response is high. When determining that the condition (iii) is met (S52: YES), the CPU 112 subtracts the reward r from K2·n (S54). That is, when the accelerator operation amount PA is excessively large, the user may feel that the torque is insufficient. In this case, a negative reward is assigned in order to impose a penalty.

When completing the process of S54 or making a negative determination in the process of S52, the CPU 112 updates the relationship defining data DR stored in the memory device 76 shown in FIG. 3. In the present embodiment, the relationship defining data DR is updated by the s-soft on-policy Monte Carlo method.

That is, the CPU 112 adds the reward r to respective returns R(Sj, Aj), which are determined by pairs of the states obtained through the process of S40 and actions corresponding to the respective states (S56). R(Sj, Aj) collectively represents the returns R each having one of the elements of the state set Sj as the state and one of the elements of the action set Aj as the action. Next, the CPU 112 averages each of the returns R(Sj, Aj), which are determined by pairs of the states and the corresponding actions obtained through the process of S40, and assigns the averaged values to the corresponding action value functions Q(Sj, Aj) (S58). The averaging process simply needs to be a process of dividing the return R, which is calculated through the process of S58, by a number obtained by the number of times the process S58 has been executed. The initial value of the return R simply needs to be 0.

Next, for each of the states obtained through the process of S40, the CPU 112 assigns, to an action Aj*, an action that is the combination of the throttle command value TA* and the gear ratio command value GR* when the corresponding action value function Q(Sj, A) has the maximum value (S60). The sign A represents an arbitrary action that can be taken. The action Aj* can have different values depending on the type of the state obtained through the process of S40. In view of simplification, the action Aj* has the same sign regardless of the type of the state in the present description.

Next, the CPU 112 updates the policy π corresponding to each of the states obtained through the process of S40 (S62). That is, the CPU 112 sets the selection probability of the action Aj* selected through S60 to $(1-\varepsilon)+\varepsilon/|A|$, where $|A|$ represents the total number of actions. The number of the actions other than the action Aj* is represented by $|A|-1$. The CPU 112 sets the selection probability of each of the actions other than the action Aj* to $\varepsilon/|A|$. The process of S62 is based on the action value function Q, which has been updated through the process of S58. Accordingly, the relationship defining data DR, which defines the relationship between the state s and the action a, is updated to increase the return R.

When the process of step S62 is completed, the CPU 112 temporarily suspends the series of processes shown in FIG. 5.

Referring back to FIG. 4, when the process of S32 is completed, the CPU 112 determines whether the action value function Q has converged (S34). In step S32, the CPU 112 simply needs to be determined that the action value function Q has converged when the number of times the amount of the action value function Q updated by the process of S52 successively becomes a predetermined value reaches a predetermined number of times. When determining that the action value function Q has not converged (S34: NO) or making a negative determination in the process of S30, the CPU 112 returns to the process of S22. When determining that the action value function Q has converged (S34: YES), the CPU 112 determines whether the CPU 112 has made an affirmative determination in the process of S34 for the case where the priority of the energy use efficiency is high and the priority of the acceleration response is high (S36).

When determining that the CPU 112 has not made an affirmative determination in the process of S34 for any one of the case where the priority of the energy use efficiency is high and the case where the priority of the acceleration response is high (S36: NO), the CPU 112 returns to the process of S20 and sets the preference variable VT. When making an affirmative determination in the process of S36, the CPU 112 temporarily suspends the series of processes shown in FIG. 4.

Figure 6:
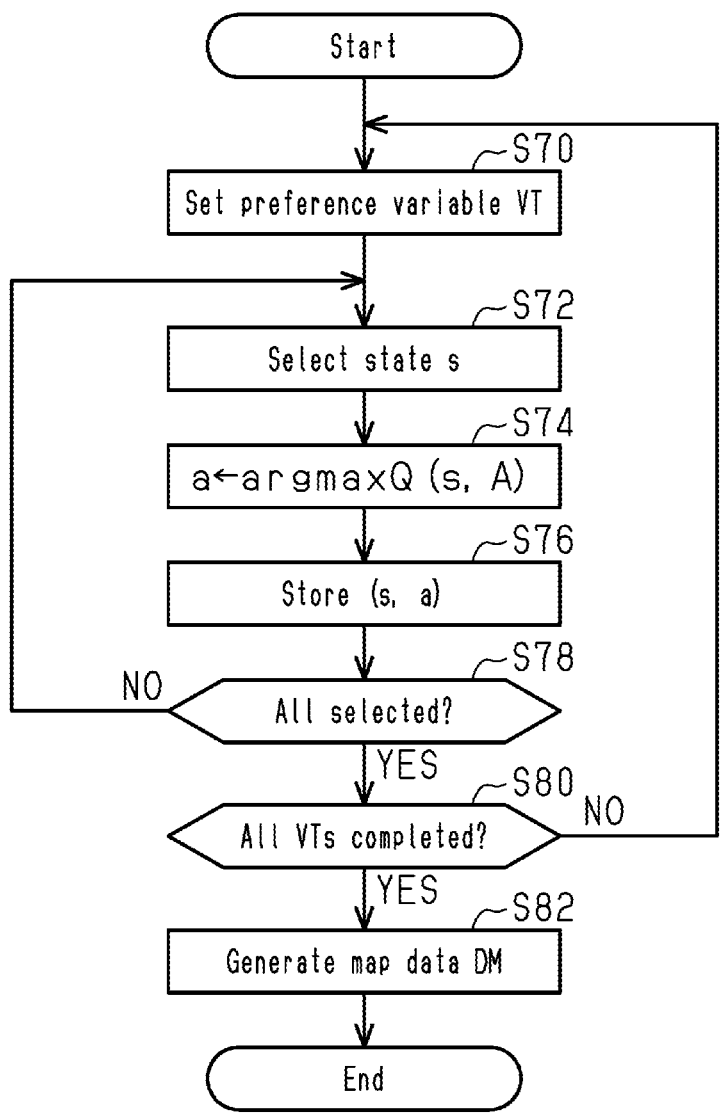
FIG. 6 is a flowchart showing a procedure of a generation process of the map data according to the first embodiment.

FIG. 6 shows a procedure of processes of, in particular, generating the map data DM based on the action value function Q learned by the process of FIG. 4, in the processes executed by the generation device 110. The process shown in FIG. 6 is implemented by the CPU 112 executing the learning program 114a stored in the ROM 114.

In the series of processes shown in FIG. 6, the CPU 112 first sets the value of the preference variable VT (S70). Then, the CPU 112 selects one of the states s that serve as the values of the input variables of the map data DM (S72). Next, the CPU 112 selects the action a that maximizes the value of one of the action value functions Q (s, A) that correspond to the state s (S74). That is, the action a is selected by a greedy policy. Subsequently, the CPU 112 causes the memory device 116 to store a set of the state s and the action a (S76).

Subsequently, the CPU 112 determines whether the states s that serve as the values of the input variables of the map data DM has been selected by the process of S72 (S78). When determining that there is an unselected states (S78: NO), the CPU 112 returns to the process of S72. When determining that all the states s have been selected (S78: YES), the CPU 112 determines whether all the values that can be taken as the value of the preference variable VT has been set by the process of S70 (S80). When determining that there is a value that has not been set yet as the value of the preference variable VT (S80: YES), the CPU 112 returns to the process of S70 and sets the value of the preference variable VT that has not been set yet.

When determining that all the values of the preference variables VT have been already set (S80: YES), the CPU 112 generates the high-response map data DM1 and the high-efficiency map data DM2 (S82). In this step, the high-response map data DM1 is generated when the value of the preference variable VT included in a state as an input of the action value function Q indicates a high priority of the acceleration response. Also, the high-efficiency map data DM2 is generated when the value of the preference variable VT included in a state as an input of the action value function Q indicates a high priority of the energy use efficiency.

When the process of step S82 is completed, the CPU 112 temporarily suspends the series of processes shown in FIG. 6.

The operation and advantage of the present embodiment will now be described.

In the system shown in FIG. 3, the CPU 112 learns the action value function Q through reinforcement learning. When the value of the action value function Q converges, it is assumed that an action suitable for meeting the standard required for the energy use efficiency and the standard required for the acceleration response has been learned. Then, for each of the states serving as the input variables of the map data DM, the CPU 112 selects an action that maximizes the action value function Q and stores a set of the state and action in the memory device 116. Next, the CPU 112 uses the set of the state and action stored in the memory device 116 to generate the map data DM. This allows the suitable throttle command value TA* and gear ratio command value GR* corresponding to the accelerator operation amount PA, vehicle speed V, and gear ratio GR to be set without excessively increasing the man-hours by skilled workers.

Particularly, in the present embodiment, the action a corresponding to the state s is separately learned according to which one of the two requested elements is high, namely, the requested element indicating that the acceleration response is high and the requested element indicating that the energy use efficiency is high. Specifically, when the value of the preference variable VT in the state s indicates that the priority of the energy use efficiency is high, a reward is assigned such that the standard related to acceleration response is loosened and a high efficiency ne is advantageous. Thus, even if the acceleration response is set to be relatively low, the reward obtained by the process of S48 is obtained by meeting the condition (i) and condition (ii) of S46. Further, maximizing the efficiency re is advantageous to increase the total reward. Accordingly, the high-efficiency map data DM2 allows for the control that increases the energy use efficiency.

When the value of the preference variable VT in the state s indicates that the acceleration response is high, the process obtained by the process of S44 is small despite an increased efficiency ηe. Thus, in order to increase the total reward, obtaining the reward of the process of S48 by meeting the condition (i) and condition (ii) of S46 is advantageous. Accordingly, the high-response map data DM1 enables the control with a favorable responsivity for the accelerator operation performed by the user.

The above-described present embodiment further provides the following advantages.

(1) The memory device 76 of the controller 70 stores the map data DM instead of, for example, the action value function Q. Thus, the CPU 72 sets the throttle command value TA* and the gear ratio command value GR* based on the map calculation that uses the map data DM. Accordingly, as compared with when executing, for example, a process that selects one of the action value functions Q that has the maximum value, the computation load is reduced.

(2) The time-series data of the accelerator operation amount PA is included in the independent variable of the action value function Q. Thus, as compared with when, for example, only a single sampled value for the accelerator operation amount PA is set as the independent variable, the value of the action a is finely adjusted for various changes in the accelerator operation amount PA.

(3) The throttle command value TA* is included in the independent variable of the action value function Q. Thus, as compared with when, for example, parameters in a model expression in which the behavior of the throttle command value TA* is modelled are set as the independent variable for the throttle opening degree, the degree of freedom of searching through reinforcement learning is easily increased.

Second Embodiment

A second embodiment will now be described with reference to FIGS. 7 and 8. Differences from the first embodiment will mainly be discussed.

Figure 7:
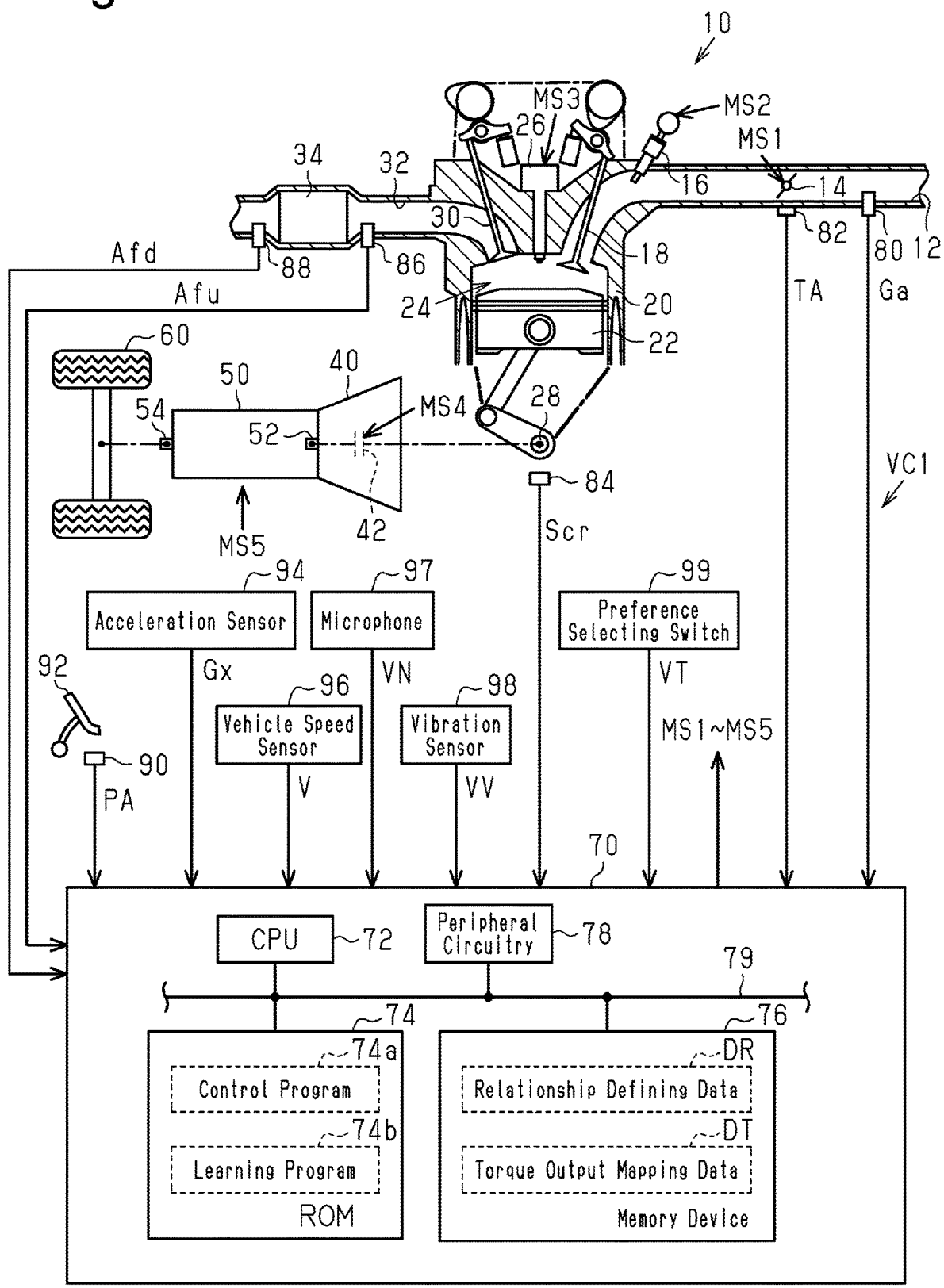
FIG. 7 is a diagram showing the controller and a drive system according to a second embodiment of the present disclosure.

FIG. 7 shows the configuration of the drive system of the vehicle VC1 and the controller 70 according to the present embodiment. In FIG. 7, the same reference numerals are given to the components that are the same as those in FIG. 1 for the illustrative purposes.

As shown in FIG. 7, in the present embodiment, the ROM 74 stores a learning program 74b in addition to the control program 74a. The memory device 76 stores the relationship defining data DR and torque output mapping data DT instead of the map data DM. The relationship defining data DR is the data that has been already learned by the process of FIG. 4 and the data in which the time-series data of the accelerator operation amount PA, the vehicle speed V, and the gear ratio GR are used as the states and the throttle command value TA* and the gear ratio command value GR* are used as the action a. The torque output mapping data DT defines a torque output map. The torque output map is the data related to a pre-trained model, such as a neural network in which the rotation speed NE, the charging efficiency r, and the ignition timing are input to the torque output map, which outputs the torque Trq. The torque output mapping data DT simply needs to be, for example, learned by using, as training data, as the torque Trq obtained by the process of S28 when the process of FIG. 4 is executed. The charging efficiency r is calculated by the CPU 72 from the rotation speed NE and the intake air amount Ga.

Figure 8:
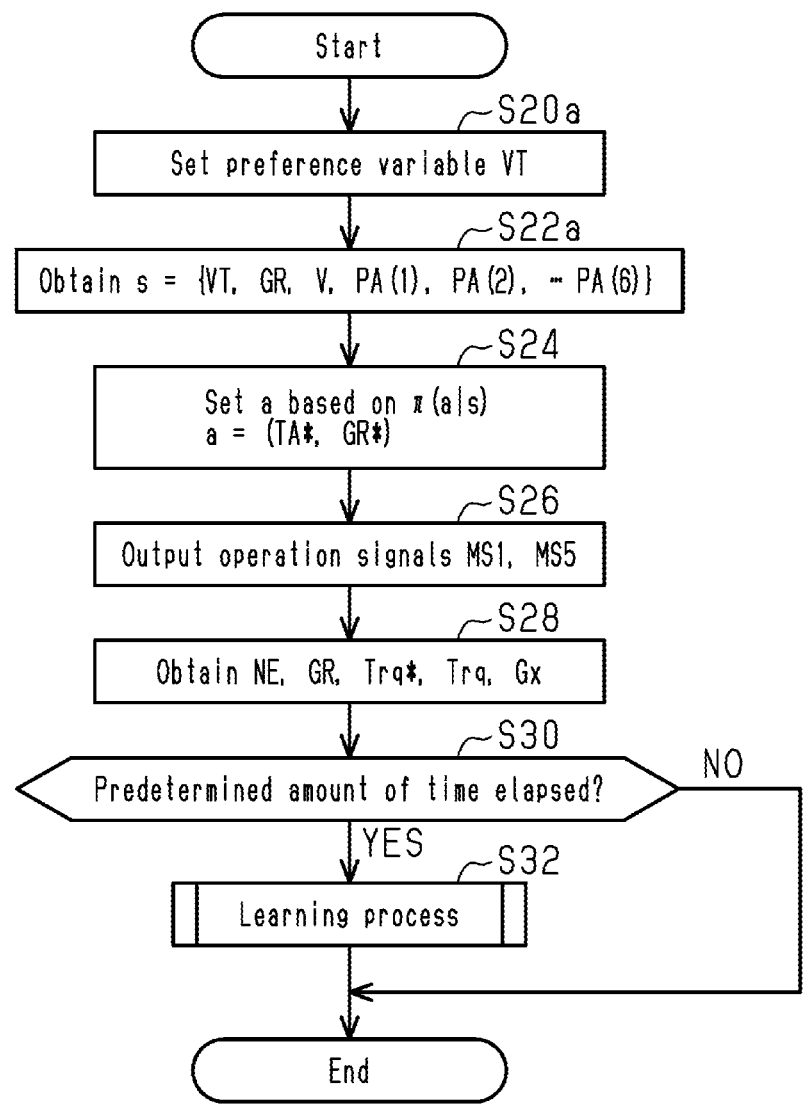
FIG. 8 is a flowchart showing a procedure of processes executed by the controller according to the second embodiment.

FIG. 8 shows a procedure of processes executed by the controller 70 of the present embodiment. The processes shown in FIG. 8 are implemented by the CPU 72 repeatedly executing the control program 74a and the learning program 74b stored in the ROM 74, for example, at predetermined intervals. In FIG. 8, the same step numbers are given to the processes that correspond to those in FIG. 4.

In the series of processes shown in FIG. 8, the CPU 72 first acquires the value of the preference variable VT (S20a). Next, the CPU 72 obtains, as the state s, the time-series data of the accelerator operation amount PA, the current gear ratio GR, the vehicle speed V, and the preference variable VT (S22a). Then, the CPU 72 executes the processes from S24 to S32 in FIG. 4. When making a negative determination in the process of S30 or completing the process of S32, the CPU 72 temporarily suspends the series of processes shown in FIG. 8. The processes of S20a, S22a, S24 to S30 are implemented by the CPU 72 executing the control program 74a, and the process of S32 is implemented by the CPU 72 executing the learning program 74b.

As described above, in the present embodiment, the relationship defining data DR and the learning program 74b are implemented in the controller 70. Accordingly, as compared with the first embodiment, the learning frequency improves.

Third Embodiment

A third embodiment will now be described with reference to FIGS. 9 to 11. The differences from the second embodiment will mainly be discussed.

In this embodiment, a policy gradient method is used as reinforcement learning.

In the present embodiment, operating the preference selecting switch 99 allows for the instruction of relative preference of four requested elements in total, namely, a requested element indicating a high acceleration response, a requested element indicating a high energy use efficiency, a requested element for the state in the passenger compartment, and a requested element for exhaust characteristics. In detail, ten points in total can be allocated to the four requested elements. That is, for example, the user can sequentially allocate four points, three points, two points, and one point to the requested element indicating a high acceleration response, the requested element indicating a high energy use efficiency, the requested element for the state in the passenger compartment, and the requested element for exhaust characteristics, respectively. In this case, the degree of preference decreases in sequence from the requested element indicating a high acceleration response, the requested element indicating a high energy use efficiency, the requested element for the state in the passenger compartment, and the requested element for exhaust characteristics. Further, for example, the user can sequentially allocate seven points, one point, one point, and one point to the requested element indicating a high acceleration response, the requested element indicating a high energy use efficiency, the requested element for the state in the passenger compartment, and the requested element for exhaust characteristics, respectively. This means that the requested element indicating a high acceleration response, which has the largest allocated point, is more preferred than the other three requested elements.

Figure 9:
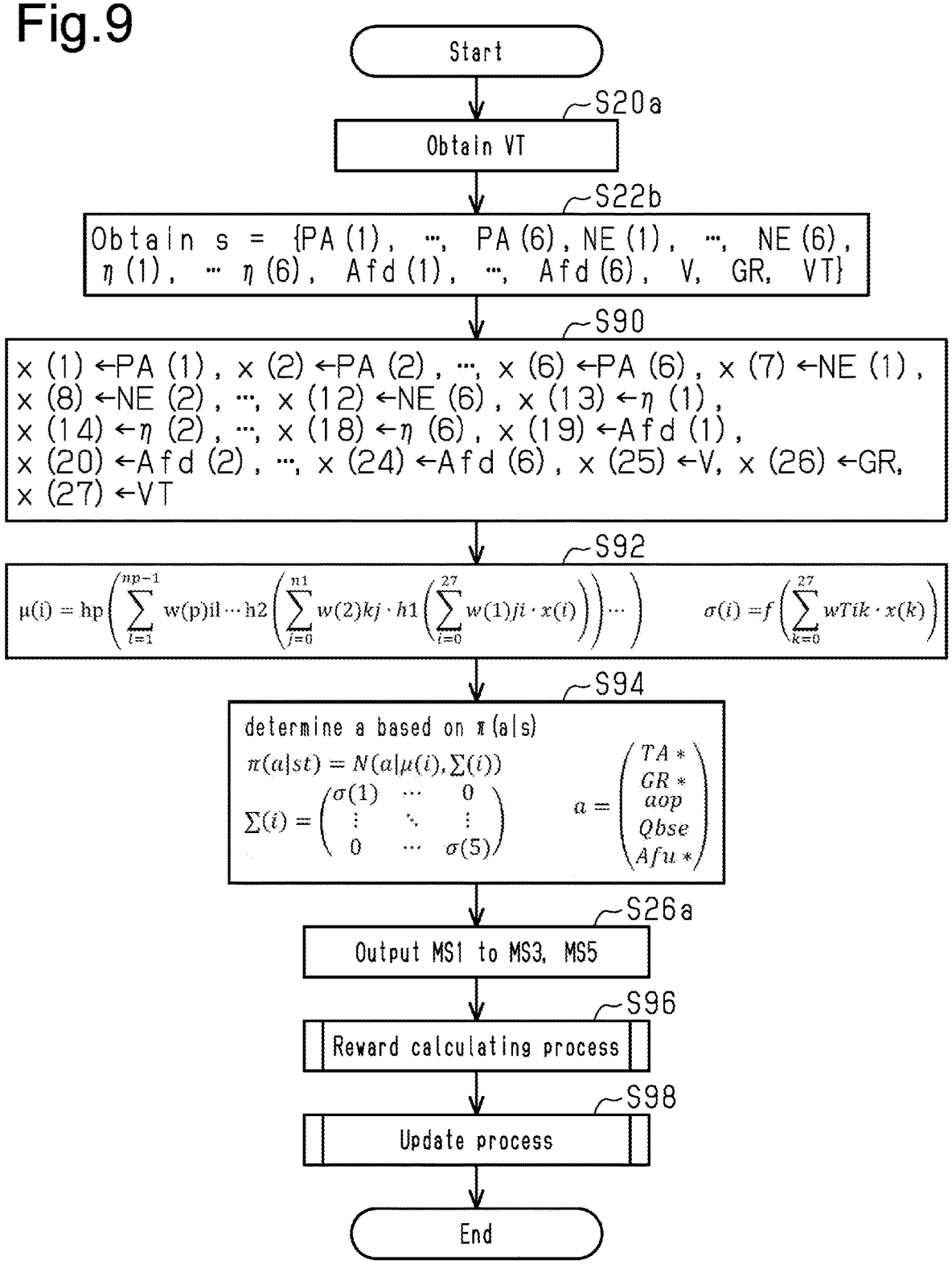
FIG. 9 is a flowchart showing a procedure of processes executed by the controller according to a third embodiment of the present disclosure.

FIG. 9 shows a procedure of processes executed by the controller 70 of the present embodiment. The processes shown in FIG. 9 are implemented by the CPU 72 repeatedly executing the control program 74a and the learning program 74b stored in the ROM 74, for example, at predetermined intervals.

In the series of processes shown in FIG. 9, when the process of S20a is completed, the CPU 72 obtains, as the state s, the time-series data of the accelerator operation amount PA, rotation speed NE, charging efficiency η, and downstream detection value Afd and obtains, as the state s, the gear ratio GR, the vehicle speed V, and the preference variable VT (S22b). In the present embodiment, the time-series data of the accelerator operation amount PA, rotation speed NE, charging efficiency η, and downstream detection value Afd includes six values that are sampled at equal intervals.

Then, the CPU 72 assigns the state s to the input variable of a function approximator that defines the policy π (S90). Specifically, the CPU 72 assigns the accelerator operation amount PA(i) to an input variable x(i) and assigns the rotation speed NE(i) to an input variable x(6+i), where i is 1 to 6. The CPU 72 assigns the charging efficiency η(i) to an input variable x(12+i) and assigns the downstream detection value Afd to an input variable x(18+i). Further, the CPU 72 assigns the vehicle speed V to an input variable x(25), assigns the gear ratio GR to an input variable x(26), and assigns the preference variable VT to an input variable x(27).

Then, the CPU 72 assigns the input variables x(1) to s(27) to the function approximator that defines a policy (S92). In the present embodiment, the policy π has a multivariate Gaussian distribution, which defines the probability that can be taken by each variable defining an action. An average value μ(1) of the multivariate Gaussian distribution indicates the average of the throttle command values TA*, and an average value μ(2) of the multivariate Gaussian distribution indicates the average of the gear ratio command values GR*. An average value μ(3) indicates the average of the retardation amounts aop, and an average value μ(4) indicates the average of base injection amounts Qb. An average value μ(5) indicates the average of upstream target values Afu*.

The retardation amount aop is a retardation amount in relation to a predetermined reference ignition timing. The reference ignition timing is the more retarded one of the MBT ignition timing and the knock limit point. The MBT ignition timing is the ignition timing at which the maximum torque is obtained (maximum torque ignition timing). The knock limit point is the advancement limit value of the ignition timing at which knocking can be limited to an allowable level under the assumed best conditions when a large-octane-number fuel, which has a large knock limit value, is used. The upstream target value Afu* is a target value used to feedback-control the upstream detection value Afu.

In the present embodiment, the covariance matrix of the multivariate Gaussian distribution is a diagonal matrix such that a variance σ(i) corresponding to each average value μ(i) may have a different value.

In the present embodiment, the average values μ(i) are formed by a neural network. In the neural network, the number of intermediate layers is p−1, activation functions h1 to hp−1 of each intermediate layer are hyperbolic tangents, and the activation function hp of the output layer is ReLU. ReLU is a function that outputs a non-smaller one of an input and 0. The value of each node of the (m−1) intermediate layer, where m is 2, 3, . . . , p, is generated by inputting, to an activation function hm, an output of a linear map defined by a coefficient w(m). Here, n1, n2, . . . , np−1 indicate the number of nodes of first, second, . . . , (p−1) intermediate layers. For example, the values of nodes of the first intermediate layer are generated by inputting, to the activation function h1, the output generated when the above-described variables x(1) to x(27) are input to the linear map defined by a coefficient w(1)ji (j=0 to n1, i=0 to 27). For example, w(1)jo is a bias parameter, and the input variable x(0) is defined as 1.

In the above-described neural network, each of five outputs of the activation function hp is set as the average value μ(i).

In the present embodiment, the variance σ(i) is set to the value of a function ƒ obtained when each of the values obtained by linearly transforming the input variables x(1) to x(27) with the linear map defined by a coefficient wTik (i=1 to 3, k=1 to 27) is input to the function ƒ. In the present embodiment, ReLU is illustrated as an example of the function ƒ.

Next, the CPU 72 determines the action a based on policy π defined by the average value μ(i) and variance σ(i) calculated by the process of S92 (S94). In this step, the probability of selecting the average value μ(i) is the highest. Also, the probability of selecting the average value μ(i) is greater when the variance σ(i) is small than when the variance σ(i) is great.

Then, the CPU 72 outputs the operation signal MS1 to the throttle valve 14, outputs the operation signal MS2 to the fuel injection valve 16, outputs the operation signal MS3 to the ignition device 26, and outputs the operation signal MS5 to the transmission 50 (S26a). Specifically, the CPU 72 outputs the operation signal MS3 in order to control the ignition timing such that a reference ignition timing changes from a value retarded by the retardation amount aop to a value feedback-corrected by the knocking control. The reference ignition timing is varied by the CPU 72 in correspondence with the rotation speed NE of the crankshaft 28 and the charging efficiency T. The charging efficiency Y is calculated by the CPU 72 based on the rotation speed NE and the intake air amount Ga. In addition, the CPU 72 outputs the operation signal MS2 based on a value obtained by correcting the base injection amount Qb with a feedback control coefficient, which is an operation amount used to feedback-control the upstream detection value Afu to the upstream target value Afu*.

Then, the CPU 72 executes the reward calculating process (S96) and executes the update process (S98) to temporarily suspend the series of processes shown in FIG. 9.

Figure 10:
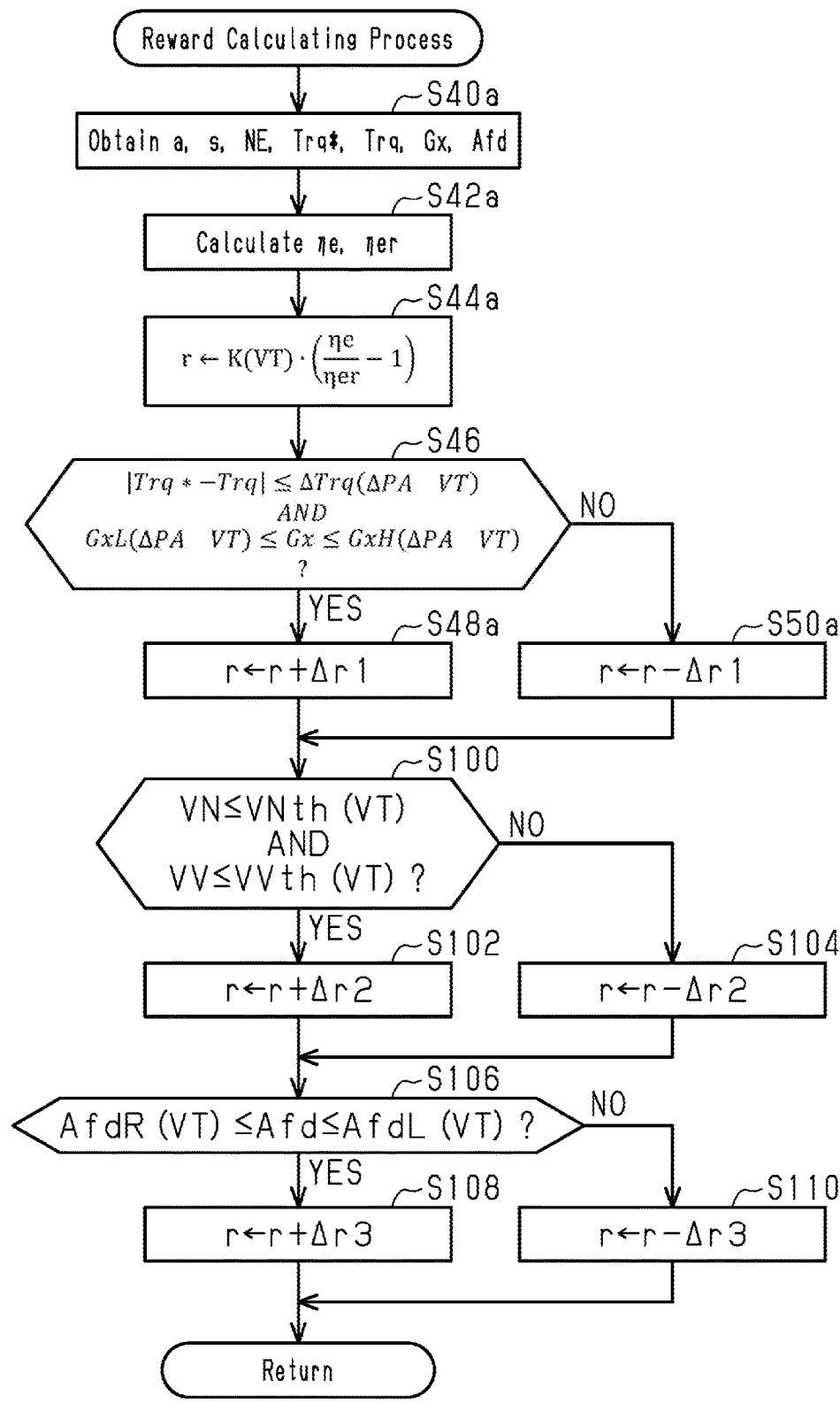
FIG. 10 is a flowchart showing a detailed procedure of the reward calculating process according to the third embodiment.

FIG. 10 illustrates the details of the process of S96.

In the series of processes shown in FIG. 10, the CPU 72 obtains the rotation speed NE, torque command value Trq*, torque Trq, acceleration Gx, and downstream detection value Afd in addition to the action a and state s (S40a).

Next, the CPU 72 uses the torque Trq and rotation speed NE to calculate the efficiency ηe and reference efficiency ηer (S42a). In the present embodiment, the efficiency ne is a value obtained by correcting, based on the retardation amount aop and upstream target value Afu*, a base value of efficiency calculated from the operating point. Then, as the reward r, the CPU 72 sets a value obtained by multiplying, by the coefficient K, a value obtained by subtracting 1 from a value obtained by dividing the efficiency ne by the reference efficiency ηer (S44a). In this step, the CPU 72 varies the coefficient K in correspondence with the preference variable VT. Specifically, in the present embodiment, since the point assigned to the requested element indicating a high energy use efficiency ranges from one to seven, the coefficient K is set to any one of seven values that differ from each other. When the point to be assigned is seven, the value of the coefficient K is the highest.

Subsequently, the CPU 72 executes the process of S46. In the present embodiment, since the point assigned to the requested element indicating a high acceleration response ranges from one to seven, each of the magnitudes of the specified amount ΔTrq, lower limit GxL, and upper limit GxH that define the condition (i) and condition (ii) is set to any one of seven values. When the point to be assigned to the requested element indicating a high acceleration response is seven, the value of the coefficient K is the lowest.

When determining that the logical conjunction of the condition (i) and condition (ii) is true (S46: YES), the CPU 72 adds a predetermined value Δr1 to the reward r (S48a). When determining that the logical conjunction is false (S46: NO), the CPU 72 subtracts the predetermined value Δr1 from the reward r (S50a).

When the process of S48a or S50a is completed, the CPU 72 determines whether the logical conjunction is true of a condition (iv) in which a noise intensity VN is less than or equal to a predetermined value VNth and a condition (v) in which the vibration intensity VV is less than or equal to a predetermined value VVth (S100). The CPU 72 varies the predetermined values VNth and VVth in correspondence with the value of the preference variable VT. Specifically, since the point assigned to the requested element indicating that the state in the passenger compartment meets the standard ranges from one to seven, each of the magnitudes of the specified amount ΔTrq, lower limit GxL, and upper limit GxH that define the condition (i) and condition (ii) is set to any one of seven values.

When determining that the logical conjunction of the condition (iv) and condition (v) is true (S100: YES), the CPU 72 adds a predetermined value Δr2 to the reward r (S102). When determining that the logical conjunction of the condition (iv) and condition (v) is false (S100: NO), the CPU 72 subtracts the predetermined value Δr2 from the reward r (S104).

The processes from S100 to S104 provide a greater reward when the state in the passenger compartment meets the standard than when the state in the passenger compartment does not meet the standard.

When the process of S102 or S104 is completed, the CPU 72 determines whether a condition (vi) is met in which the downstream detection value Afd is greater than or equal to a rich-side threshold value AfdR and less than or equal to a lean-side threshold value AfdL (S106). The CPU 72 varies the rich-side threshold value AfdR and lean-side threshold value AfdL in correspondence with the value of the preference variable VT. Specifically, in the present embodiment, since the point assigned to the requested element related to exhaust characteristics ranges from one to seven, each of the magnitudes of the rich-side threshold value AfdR and lean-side threshold value AfdL is set to any one of seven values. When the point assigned to the requested element related to exhaust characteristics is the minimum value (i.e., one), the rich-side threshold value AfdR is the minimum value of the seven values and the lean-side threshold value AfdL is the maximum value. Even in this case, the magnitudes of the rich-side threshold value AfdR and lean-side threshold value AfdL are set such that the regulations related to exhaust gas are met.

When determining that the condition (vi) is met (S106: YES), the CPU 72 adds a predetermined value Δr3 to the reward r (S108). When determining that the condition (vi) is not met (S106: NO), the CPU 72 subtracts the predetermined value Δr3 from the reward r (S110).

When the process of step S108 or S110 is completed, the CPU 72 temporarily suspends the series of processes shown in FIG. 10.

Figure 11:
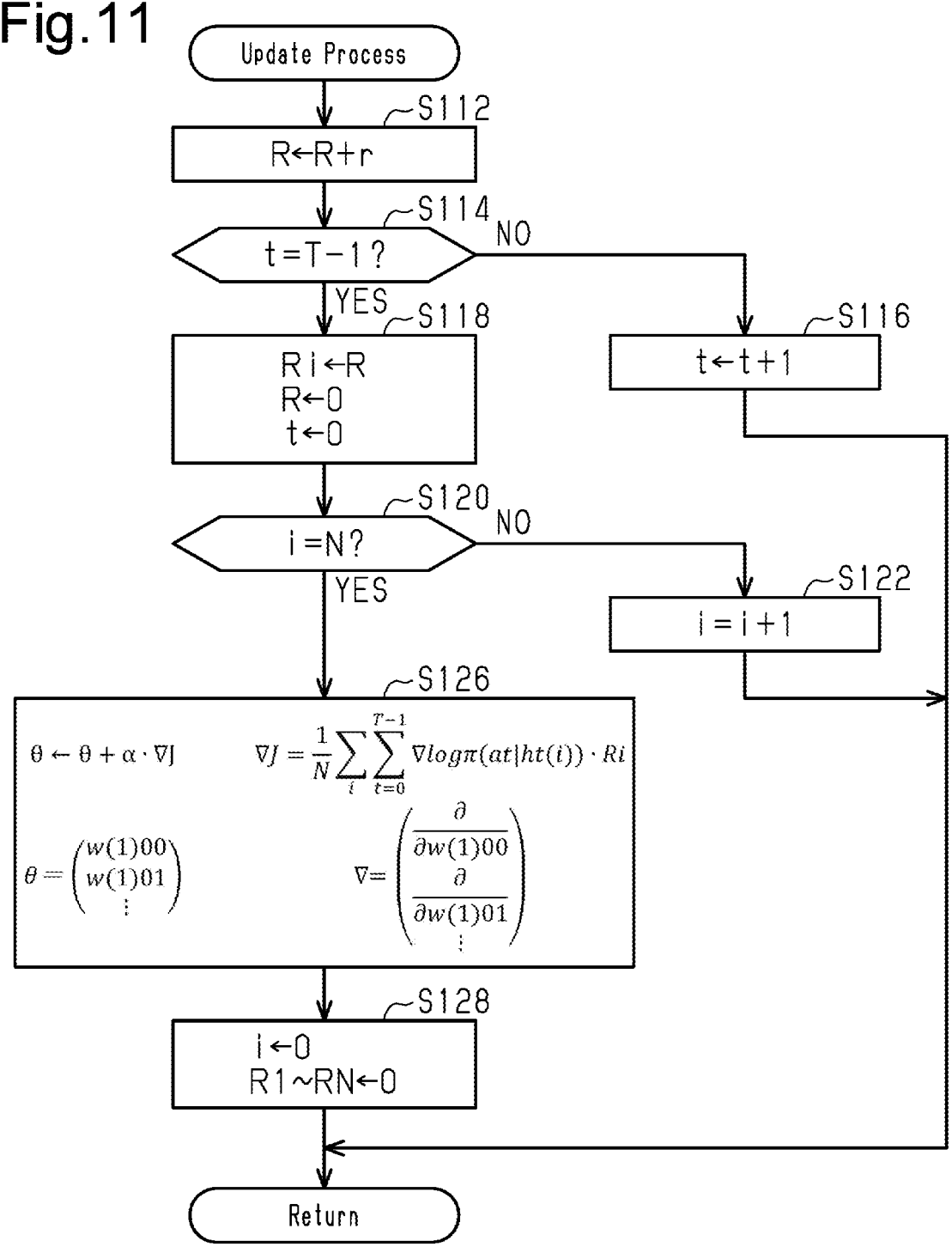
FIG. 11 is a flowchart showing a detailed procedure of the update process according to the third embodiment.

FIG. 11 illustrates the details of an update process of S98.

As shown in FIG. 11, the CPU 72 first adds the reward r to the return R (S112). Then, the CPU 72 determines whether a variable t has reached a predetermined time T−1 (S114). When determining that the variable t has not reached the predetermined time T−1 (S114: NO), the CPU 72 increments the variable t (S116).

When determining that the variable t has reached the predetermined time T−1 (S114: YES), the CPU 72 assigns the return R to a return R1 to initialize the return R and variable t (S118). Next, the CPU 72 determines whether a variable i has reached a predetermined value N (S120). When determining that the variable i has not reached the predetermined value N (S120: NO), the CPU 72 increments the variable i (S122).

When determining that the variable i has reached the predetermined value N (S122: YES), the CPU 72 uses the policy gradient method to update the variables w(1) to w(p), which define the policy π, and the coefficient wT (S126). In FIG. 11, the variables w(1) to w(p), which define the policy π, and the coefficient wT are collectively referred to as a parameter θ.

Suppose that T-sets of the state s, action a, and reward r during a period until the variable t reaches 0 to T−1 are referred to as trajectories ht. The probability at which the trajectory ht is achieved in accordance with the policy π defined by the parameter θ is set as a probability pθ(ht). An integrated value obtained by the trajectory ht of pθ(ht)·Rt is an expected value (expected return J) of the return R(ht). The parameter θ is updated so as to maximize the expected value. The update of the parameter θ is achieved by setting the update amount of each component of the parameter θ to an amount proportional to a value obtained by partially differentiating the expected return J by the component.

When states s0, s1, . . . sT and actions a0, a1, . . . aT are used, the probability pθ(ht) is as follows.

$$p\theta(ht)=p(s0){\cdot}p(s1|s0,a0){\cdot}\pi(a0|s0){\cdot}p(s2|s1,a1){\cdot}$$
$$\pi(a1|s1) \ldots p(sT|sT-1,aT-1){\cdot}\pi(aT-1|sT-1)$$

At the initial probability p(s0), the state s0 is obtained. At the transition probability p(st+1|st, at), the state st changes to the state st+1 at the time of the state st and action at.

Accordingly, the partial differentiation of the expected return J is led by the following equation (c1).

$$\nabla j = \nabla \int p\theta(ht)\cdot R(ht)dht = \int R(ht)p\theta(ht)\nabla\log p\theta(ht)dht = \int R(ht)p\theta(ht)\sum_{t=0}^{T-1}\nabla\log\pi(at|st)dht \qquad (c1)$$

The probability pθ(ht) is not knowable. Thus, the integration in the above-described equation (c1) is replaced with the average value obtained from N trajectories ht (N represents a predetermined number).

Accordingly, the partial differentiation by each component of the parameter θ of the expected return J is a value obtained by adding, to N expected returns J (N represents the predetermined number), the product of the return R1 and the sum of t=0 to T−1 in a partial differentiation coefficient of the component corresponding to the parameter with respect to the logarithm of the policy π(at|st) and then dividing the added value by the predetermined value N.

Then, the CPU 72 sets the update amount of the component corresponding to the parameter θ to a value obtained by multiplying, by a learning rate a, the partial differentiation coefficient of the expected return J by each component of the parameter θ.

When the process of S126 is completed, the CPU 72 initializes the variable i and the returns R1 to RN (S128).

When completing the process of S128 or when making a negative determination in the process of S114 or S120, the CPU 72 temporarily suspends the series of processes shown in FIG. 11. The processes shown in FIG. 11 are implemented by executing the execution command of an update map to which the states s0, s1, . . . , the actions a0, a1, . . . and the reward r in the learning program 74b stored in the ROM 74 are input and which outputs the updated parameter θ.

The operation and advantage of the present embodiment will now be described.

The CPU 72 calculates the reward r in terms of the four requested elements, namely, the requested element indicating a high energy use efficiency, the requested element indicating a high acceleration response, the requested element indicating the state in the passenger compartment, and the requested element related to exhaust characteristics. The manner of calculating the reward r is varied in correspondence with the value of the preference variable VT. The four requested elements may conflict with each other. Thus, changing the manner of assigning the reward r in correspondence with the value of the preference variable VT allows the process of calculating the reward r to be set such that it is advantageous to meet a high-priority requested element when increasing the reward r. This allows for the control that corresponds to a relative preference of the four requested elements indicated by the value of the preference variable VT.

The above-described present embodiment further provides the following advantages.

(4) The CPU 72 sets the throttle command value TA*, gear ratio command value GR*, retardation amount aop, base injection amount Qb, and upstream target value Afu* in accordance with the policy π based on the time-series data of the accelerator operation amount PA, rotation speed NE, charging efficiency η, and downstream detection value Afd and based on the gear ratio GR, the vehicle speed V, and the preference variable VT. If only the base injection amount Qb serving as an open-loop operation amount is set as a value proportional to the charging efficiency η during the transient time, the upstream detection value Afu and downstream detection value Afd may deviate from the range between the rich-side threshold value AfdR and lean-side threshold value AfdL. Further, if the manner of setting the base injection amount Qb is adapted through trial and error by skilled workers, the man-hours by the skilled workers increase. In the present embodiment, reinforcement learning is performed to learn the base injection amount Qb, which is the injection amount of open-loop control. This effectively reduces the man-hours required for the skilled workers to set the injection amount of open-loop control performed for air-fuel ratio control during the transient time.

(5) The preference variable VT allows the relative importance of the four requested elements to be indicated. Thus, the preference variable VT allows the preference of the user to be indicated more meticulously.

(6) The function approximator is used for the relationship defining data DR. Thus, even if the action and state are continuous variables, the relationship defining data DR is easily handled.

Fourth Embodiment

A fourth embodiment will now be described with reference to FIGS. 12 and 13. Differences from the third embodiment will mainly be discussed.

In the present embodiment, the relationship defining data DR is updated outside the vehicle VC1.

Figure 12:
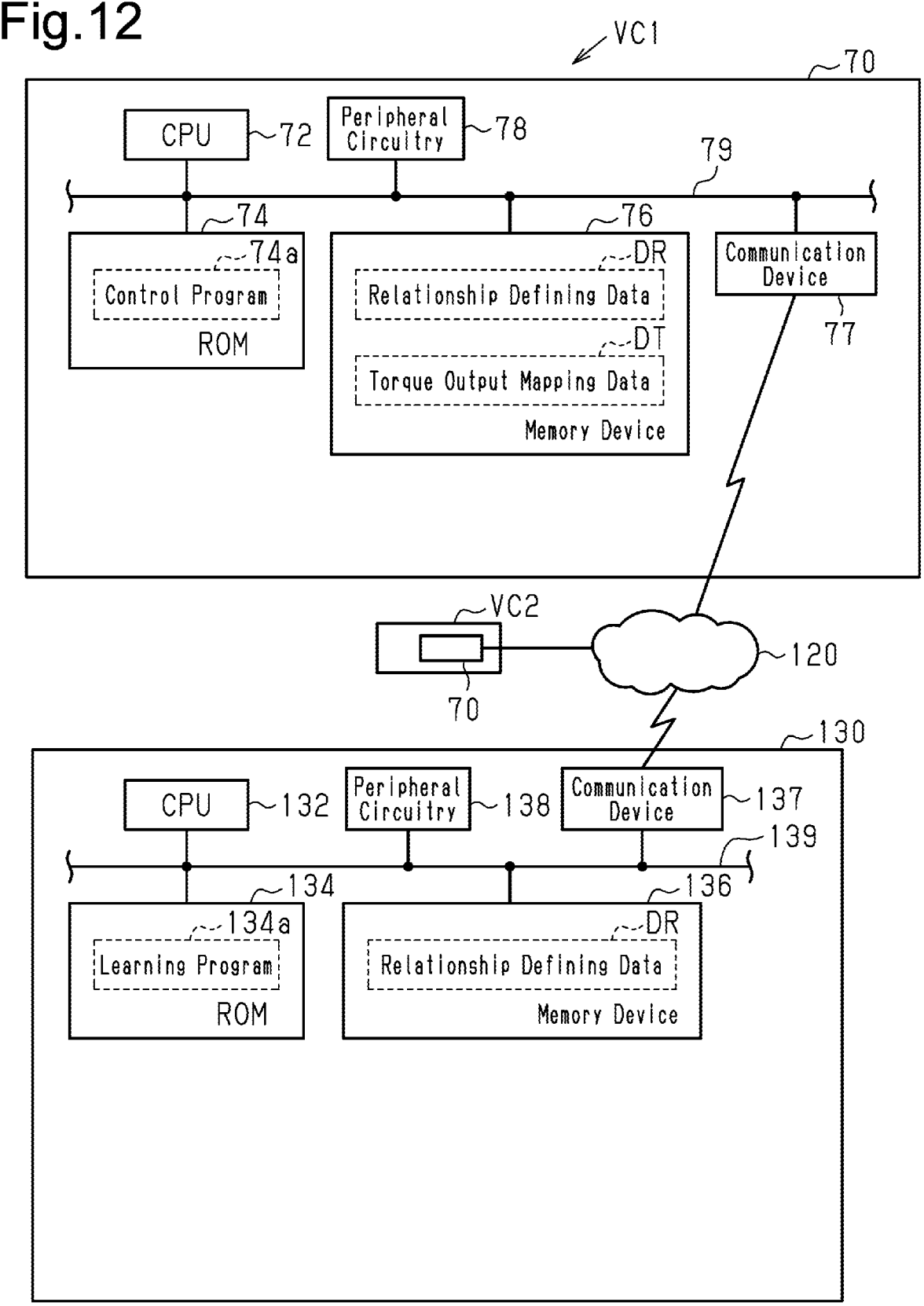
FIG. 12 is a diagram showing the configuration of a system according to a fourth embodiment of the present disclosure.

FIG. 12 shows the configuration of a control system that performs reinforcement learning In FIG. 12, the same reference numerals are given to the components that are the same as those in FIG. 7 for the illustrative purposes.

The ROM 74 of the controller 70 in the vehicle VC1 shown in FIG. 12 stores the control program 74a, but does not store the learning program 74b. The controller 70 includes a communication device 77. The communication device 77 communicates with a data analysis center 130 via a network 120 outside the vehicle VC1.

The data analysis center 130 analyzes data transmitted from vehicles VC1, VC2, . . . . The data analysis center 130 includes a CPU 132, a ROM 134, a nonvolatile memory that can be electrically rewritten (memory device 136), peripheral circuitry 138, and a communication device 137, which can communicate with each other through a local network 139. The ROM 134 stores a learning program 134a and the memory device 136 stores the relationship defining data DR.

Figure 13:
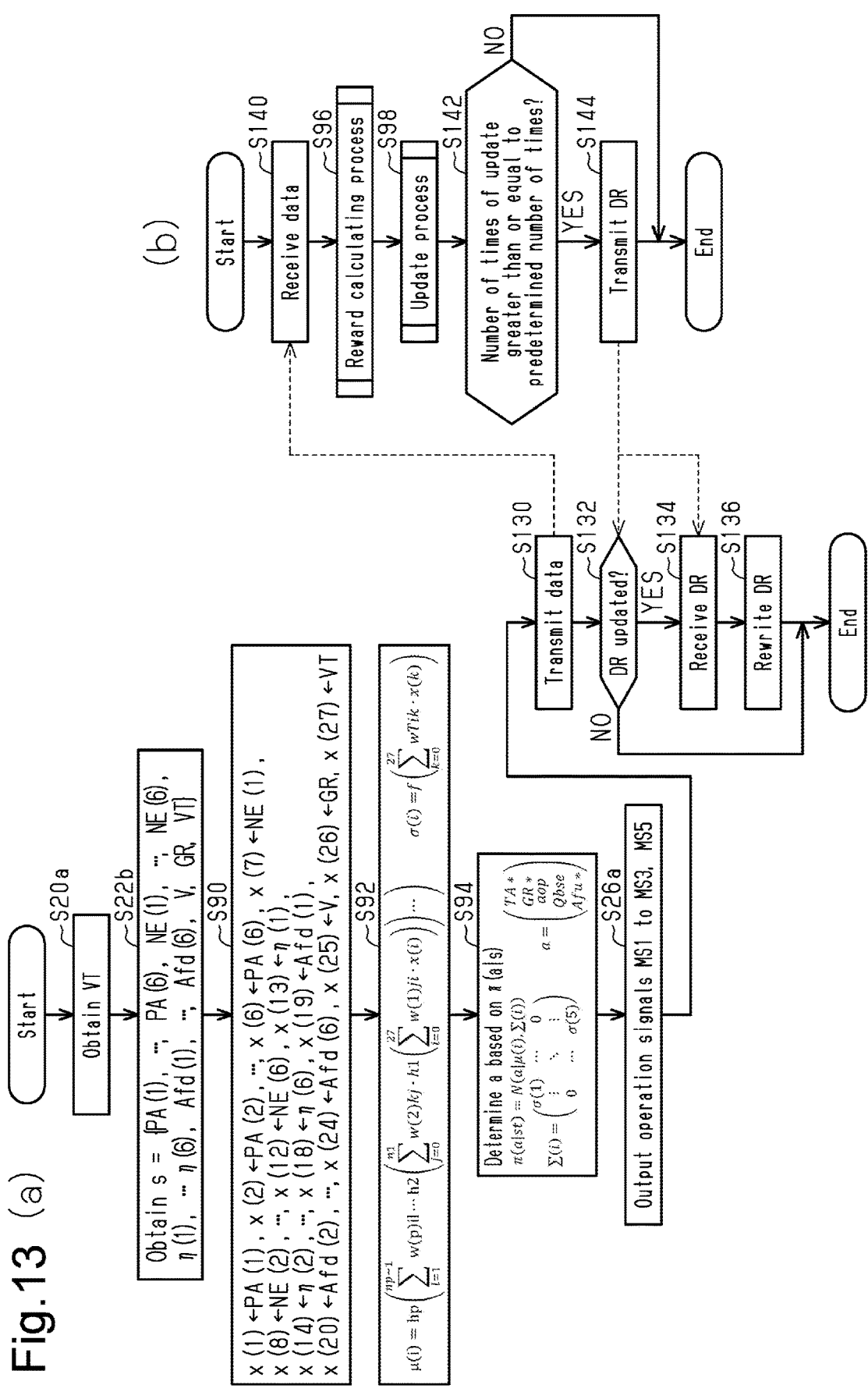
FIG. 13 includes sections (a) and (b), which show a procedure of processes executed by the system according to the third embodiment.

FIG. 13 shows a procedure of processes of reinforcement learning according to the present embodiment. The process shown in a section (a) of FIG. 13 is implemented by the CPU 72 executing the control program 74a stored in the ROM 74 shown in FIG. 12. The process shown in a section (b) of FIG. 13 is implemented by the CPU 132 executing the learning program 134a stored in the ROM 134. In FIG. 13, the same step numbers are given to the processes that correspond to those in FIG. 9. The process shown in FIG. 13 will now be described with reference to the temporal sequence of the reinforcement learning.

In the series of processes shown in the section (a) of FIG. 13, the CPU 72 executes the processes of S20a, S22b, S90 to S94, S26a and then operates the communication device 77 to transmit data necessary for the update process of the relationship defining data DR (S130). The transmitted data includes the state s, action a, torque command value Trq*, torque Trq, acceleration Gx, downstream detection value Afd, noise intensity VN, vibration intensity VV, and preference variable VT.

As shown in the section (b) of FIG. 13, the CPU 132 receives the transmitted data (S140) and executes the processes of S96, S98 based on the received data. The CPU 132 determines whether the number of times of update of the relationship defining data DR is greater than or equal to a predetermined number of times (S142). When determining that the number of times of update is greater than or equal to the predetermined number of times (S142: YES), the CPU 132 operates the communication device 137 to transmit the relationship defining data DR to the vehicle VC1, which transmitted the data that was received by the data analysis center 130 through the process of S140 (S144). When completing the process of S144 or when making a negative determination in the process of S142, the CPU 132 temporarily suspends the series of processes shown in the section (b) of FIG. 13.

As shown in the section (a) of FIG. 13, the CPU 72 determines whether there is updated data related to the relationship defining data DR (S132). When determining that there is updated data (S132: YES), the CPU 72 receives the updated relationship defining data DR (S134). Then, the CPU 72 rewrites the relationship defining data DR used in the process of S94 with the received relationship defining data DR (S136). When completing the process of S136 or when making a negative determination in the process of S132, the CPU 72 temporarily suspends the series of processes shown in the section (a) of FIG. 13.

As described above, the present embodiment updates the relationship defining data DR outside the vehicle VC1. This reduces the computation load on the controller 70. Further, if the process of S98 is executed by the data analysis center 130 receiving data from multiple vehicles VC, VC2 in the process of S140, the number of data sets used for learning can be increased easily.

Correspondence

The correspondence between the items in the above exemplary embodiments and the items described in the above SUMMARY is as follows. Below, the correspondence is shown for each of the numbers in the examples described in the above SUMMARY.

[1], [2] The execution device corresponds to the CPU 72 and ROM 74 in FIG. 7, the CPU 112 and ROM 114 in FIG. 3, and the CPUs 72, 132 and ROMs 74, 134 in FIG. 12. The memory device corresponds to the memory device 76 in FIG. 7, the memory device 116 in FIG. 3, and the memory devices 76, 136 in FIG. 12.

The obtaining process that obtains the state of the vehicle and the preference variable corresponds to the processes of S22, S28 in FIG. 4, the processes of S22a, S28 in FIG. 8, and the processes of S22b, S40a in FIGS. 9 and 10.

The operation process that operates the electronic device corresponds to the processes of S26, S26a.

The reward calculating process that provides a reward corresponds to the processes from S42 to S54 and the process of S96.

The update process that updates the relationship defining data corresponds to the processes from S56 to S62 and the process of S98.

The update map corresponds to the map defined by the command that executes the processes from S56 to S62 and the process of S98 in the learning program 74b.

The changing process that changes a reward corresponds to varying the coefficient K in correspondence with the preference variable VT in the process of S44, varying the condition (i) and condition (ii) in correspondence with the preference variable VT in the process of S46, and varying the threshold value PAth in correspondence with the preference variable VT in the process of S52.

Further, the changing process corresponds to varying the condition (iv) and condition (v) in correspondence with the preference variable VT in the process of S100 and varying the condition (vi) in correspondence with the preference variable VT in the process of S106.

[3] The control mapping data refers to the map data DM.

[4] The execution device corresponds to the CPU 72 and the ROM 74 in FIG. 7, and the memory device corresponds to the memory device 76 in FIG. 7.

[5]-[7] The first execution device corresponds to the CPU 72 and the ROM 74, and the second execution device corresponds to the CPU 132 and the ROM 134.

Other Embodiments

The present embodiment may be modified as follows. The above-described embodiments and the following modifications can be combined as long as the combined modifications remain technically consistent with each other.

Regarding Preference Variable

When the preference variable VT indicates the ranking of preference for two different requested elements and does not indicate the magnitude of the difference of the preference, the preference variable does not have to indicate the ranking of preference for two requested elements, namely, the requested element indicating a high energy use efficiency and the requested element indicating a high acceleration response. For example, the preference variable may indicate the ranking of preference for two of four requested elements, namely, the requested element indicating a high energy use efficiency, the acceleration response, the requested element indicating the state in the passenger compartment, and the requested element related to exhaust characteristics. Alternatively, for example, the preference variable may indicate the ranking of preferences for three of the four requested elements. As another option, for example, the preference variable may indicate the ranking of preferences for the four requested elements.

When the preference variable VT is set as a variable capable of indicating the magnitude of the difference of the preference for two of several requested elements, the preference variable does not necessarily have to indicate the preference for the four requested elements in total, namely, the requested element indicating a high energy use efficiency, the acceleration response, the requested element indicating the state in the passenger compartment, and the requested element related to exhaust characteristics. For example, the preference variable may be capable of indicating the magnitude of the preference for three of the four requested elements. Alternatively, the preference variable may be capable of indicating the magnitude of the preference for two of the four requested elements. Additionally, the total points assigned to all the requested elements do not necessarily have to be ten.

The requested element indicating the state in the passenger compartment is not limited to a requested element indicating a low noise intensity or a requested element indicating a low vibration intensity. For example, the requested element indicating the state in the passenger compartment may be or include a requested element indicating that the temperature in the passenger compartment is within a predetermined range.

Changing Process

The process of S46 varies the condition (i) and condition (ii) in correspondence with the value of the preference variable VT. Instead, for example, the coefficient K1 in the process of S48, S50 in FIG. 5 or the predetermined value Δr1 in the process of S48a, S50a in FIG. 10 may be varied in correspondence with the value of the preference variable VT. That is, for example, the coefficient K1 of S48, S50 in FIG. 5 is decreased when the value of the preference variable VT indicates the preference of the requested element indicating a high energy use efficiency. In this case, it is not so advantageous to meet the condition (i) and condition (ii) when increasing the total reward. This facilitates the learning that increases the efficiency ηe.

The process of S52 in FIG. 5 varies the condition (iii) in correspondence with the value of the preference variable VT. Instead, for example, the coefficient K2 in the process of S54 may be varied in correspondence with the value of the preference variable VT. That is, for example, the coefficient K2 is decreased when the value of the preference variable VT indicates the preference of the requested element indicating a high energy use efficiency. In this case, it is not so advantageous to make a negative determination in the process of S52 when increasing the total reward. This facilitates the learning that increases the efficiency re.

The CPU 112 does not have to execute only one of the process that changes the standard ((i), (ii), (iii)) related to acceleration response like the process of S46 or S52 and the process that changes the reward (K1; Ar, K2) according to whether the standard related to acceleration response is met like in the above-described modification. Instead, the CPU 112 may execute both of these processes.

In FIG. 5, when the value of the preference variable VT indicates the preference for the requested element indicating a high acceleration response, the coefficient K is decreased and the conditions (i) to (iii) are made strict. Instead, only decreasing the coefficient K may be performed. This makes it unbeneficial to increase the efficiency ηe when obtaining a great reward. Thus, the action that increases the acceleration response tends to be a greedy action.

For example, in the process of FIG. 5, when the value of the preference variable VT indicates the preference for the requested element indicating a high energy use efficiency, the process is not executed that provides a greater reward when the acceleration response meets the standard than when the exhaust characteristic does not meet the standard. The changing process may be like this.

The process of S100 in FIG. 10 varies the condition (iv) and condition (v) in correspondence with the value of the preference variable VT. Instead, the predetermined value Δr2 in the process of S102 or S104 may be varied in correspondence with the value of the preference variable VT. That is, for example, when the value of the preference variable VT indicates a high degree of the preference for the requested element indicating the state in the passenger compartment, the predetermined value Δr2 id increased. In this case, it is advantageous to make an affirmative determination in the process of S100 when increasing the total reward. Thus, the action a that reduces noise and vibration tends to be a greedy action.

The process of S106 in FIG. 10 varies the condition (vi) in correspondence with the preference variable VT. Instead, the predetermined value Δr3 in the process of S108 or S110 may be varied in correspondence with the value of the preference variable VT.

The CPU 72 does not have to execute only one of the process that changes the standard (VNth, VVth) related to the state in passenger compartment like the process of S100 in FIG. 10 and the process that changes the reward (Δr2) according to whether the standard related to the state in the passenger compartment is met like in the above-described modification. Instead, the CPU 72 may execute both of these processes.

The CPU 72 does not have to execute only one of the process that changes the standard (AfdR, AfdL) related to exhaust characteristic like the process of S106 in FIG. 10 and the process that changes the reward (Δr3) according to whether the standard related to exhaust characteristic is met like in the above-described modification. Instead, the CPU 72 may execute both of these processes.

In the process of FIG. 10, the conditions or rewards for all of the four requested elements are changed in correspondence with the preference variable VT. Instead, for example, only three of the four requested elements may be varied in correspondence with the preference variable VT.

Regarding Reduction of Dimensions of Table-Type Data

The method of reducing the dimensions of table-type data is not limited to the one in the above-described embodiments. The accelerator operation amount PA rarely reaches the maximum value. Accordingly, the action value function Q does not necessarily need to be defined for the state in which the accelerator operation amount PA is greater than or equal to the specified amount, it is possible to adapt the throttle command value TA* and the like independently when the accelerator operation amount PA is greater than or equal to the specified value. The dimensions may be reduced by removing, from possible values of the action, values at which the throttle command value TA* is greater than or equal to the specified value.

Regarding Relationship Defining Data

In the above-described embodiments, the action value function Q is a table-type function. However, the present disclosure is not limited to this. For example, a function approximator may be used.

In the above-described embodiments, the preference variable VT is included in the independent variable of the function approximator that indicates a policy. Instead, for example, a different function approximator may be provided for each of the values of the preference variable VT.

Regarding Operation Process

For example, when using a function approximator as the action value function Q as described in the Regarding Relationship Defining Data section above, all the groups of discrete values related to actions that are independent variables of the table-type function of the above-described embodiments are input to the action value function Q together with the state s. The action a that maximizes the action value function Q simply needs to be specified in this manner. In this case, while the specified action a is mainly employed for operation, the other actions simply need to be selected at a predetermined probability.

Regarding Update Map

The ε-soft on-policy Monte Carlo method is executed in the process from S56 to S62 in FIG. 5. However, the present disclosure is not limited to this. For example, an off-policy Monte Carlo method may be used. Also, methods other than Monte Carlo methods may be used. For example, an off-policy TD method may be used. An on-policy TD method such as a SARSA method may be used. Alternatively, an eligibility trace method may be used as an on-policy learning.

For example, when the policy π is expressed using a policy π, and the policy π is directly updated based on the reward r, the update map is preferably constructed using, for example, a policy gradient method.

The present disclosure is not limited to the configuration in which only one of the action value function Q and the policy π is directly updated using the reward r. For example, the action value function Q and the policy π may be separately updated as in an actor critic method. In an actor critic method, the action value function Q and the policy π do not necessarily need to be updated. For example, in place of the action value function Q, a value function V may be updated.

Regarding Action Variable

In the above-described embodiments, the throttle command value TA* is used as an example of the variable related to the opening degree of a throttle valve, which is an action variable. However, the present disclosure is not limited to this. For example, the responsivity of the throttle command value TA* to the accelerator operation amount PA may be expressed by dead time and a secondary delay filter, and three variables, which are the dead time and two variables defining the secondary delay filter, may be used as variables related to the opening degree of the throttle valve. In this case, the state variable is preferably the amount of change per unit time of the accelerator operation amount PA instead of the time-series data of the accelerator operation amount PA.

As described in the Regarding Internal Combustion Engine section below, in the case of a compression ignition internal combustion engine, a variable related to an injection amount simply needs to be used in place of the variable related to the opening degree of the throttle valve. Further, in addition to the variable related to the injection amount, for example, a variable related to the injection timing and a variable related to the number of times of injection within a single combustion cycle may be used. Furthermore, a variable related to the time interval between the ending point in time of one fuel injection and the starting point in time of the subsequent fuel injection for a single cylinder within a single combustion cycle may be used.

For example, in a case in which the transmission 50 is a multi-speed transmission, the action variable may be the value of the current supplied to the solenoid valve that adjusts the engagement of the clutch using hydraulic pressure.

When a rotating electric machine is subject to the operation corresponding to the action variable as described in the Regarding Electronic Device section below, the action variable simply needs to include the torque and current of the rotating electric machine. That is, a load variable, which is related to the load on the propelling force generator, is not limited to the variable and injection amount related to the opening degree of the throttle valve and may be the torque and current of the rotating electric machine.

When a lockup clutch 42 is subject to the operation corresponding to the action variable as described in the Regarding Electronic Device section below, the action variable simply needs to include a variable that indicates an engagement state of the lockup clutch 42.

Regarding State

In the above-described embodiments, the time-series data of the accelerator operation amount PA includes six values that are sampled at equal intervals. However, the present disclosure is not limited to this. The time-series data of the accelerator operation amount PA may be any data that includes two or more values sampled at different sampling points in time. It is preferable to use data that includes three or more sampled values or data of which the sampling interval is constant.

The state variable related to the accelerator operation amount is not limited to the time-series data of the accelerator operation amount PA. For example, as described in the Regarding Action Variable section above, the amount of change per unit time of the accelerator operation amount PA may be used.

In the above-described embodiments, the time-series data of the rotation speed NE includes six values that are sampled at equal intervals. However, the present disclosure is not limited to this. The time-series data of the rotation speed NE may be any data that includes two or more values sampled at different sampling points in time. It is preferable to use data that includes three or more sampled values or data of which the sampling interval is constant.

In the above-described embodiments, the time-series data of the charging efficiency η includes six values that are sampled at equal intervals. However, the present disclosure is not limited to this. The time-series data of the charging efficiency η may be any data that includes two or more values sampled at different sampling points in time. It is preferable to use data that includes three or more sampled values or data of which the sampling interval is constant.

In the above-described embodiments, the time-series data of the downstream detection value Afd includes six values that are sampled at equal intervals. However, the present disclosure is not limited to this. The time-series data of the downstream detection value Afd may be any data that includes two or more values sampled at different sampling points in time. It is preferable to use data that includes three or more sampled values or data of which the sampling interval is constant.

When the state includes the time-series data of multiple variables, the number of samplings of the time-series data of these variables does not necessarily have to be the same.

For example, when the current value of the solenoid valve is used as the action variable as described in the Regarding Action Variable section above, the state simply needs to include the rotation speed of the input shaft 52 of the transmission, the rotation speed of the output shaft 54, and the hydraulic pressure regulated by the solenoid valve. Also, when the torque or the output of the rotating electric machine is used as the action variable as described in the Regarding Action Variable section above, the state simply needs to include the state of charge and the temperature of the battery. Further, when the action includes the load torque of the compressor or the power consumption of the air conditioner as described in the Regarding Action Variable section above, the state simply needs to include the temperature in the passenger compartment.

Regarding Reward Calculating Process

The process that provides a greater reward when the energy use efficiency is high than when the energy use efficiency is low is not limited to, a process that obtains the difference between 1 and the ratio of the reference efficiency to the efficiency of an actual operating point, like the process shown in S44 of FIG. 5. Instead, for example, a process that obtains the difference between the reference efficiency and the efficiency of an actual operating point may be employed.

The process that provides a greater reward when the standard related to acceleration response is met than when the standard is not met is not limited to the process that provides a reward according to whether the logical conjunction of the condition (i) and condition (ii) is true as shown in S46 of FIG. 5 or the process that provides a small reward according to whether the condition (iii) is satisfied as shown in S52 of FIG. 5. For example, regarding the process that provides a reward according to whether the logical conjunction of the condition (i) and condition (ii) is true and the process that provides a small reward according to whether the condition (iii) is met, only the latter one may be included. Further, instead of the process that provides a reward according to whether the logical conjunction of the condition (i) and condition (ii) is true, a process may be executed that provides a reward according to whether the condition (i) is met and a process that provides a reward according to whether the condition (ii) is met.

For example, instead of providing the same reward without exception when the condition (i) is met, a process may be executed in which a greater reward is provided when the absolute value of the difference between the torque Trq and the torque command value Trq* is small than when the absolute value is great. Also, instead of providing the same reward without exception when the condition (i) is not met, a process may be executed in which a smaller reward is provided when the absolute value of the difference between the torque Trq and the torque command value Trq* is great than when the absolute value is small.

For example, instead of providing the same reward without exception when the condition (ii) is met, a process may be executed in which the reward is varied in accordance with the acceleration Gx. Also, instead of providing the same reward without exception when the condition (ii) is not met, a process may be executed in which the reward is varied in accordance with the acceleration Gx.

In the process of FIG. 10, the reward is provided depending on whether the logical conjunction of the condition (iv) and the condition (v) in S100 is true. However, the present disclosure is not limited to this. For example, two processes may be executed, namely, a process that provides a greater reward when the vibration intensity VV of the vehicle is less than or equal to the predetermined value VVth than when the vibration intensity VV is greater than the predetermined value VVth, and a process that provides a greater reward when the noise intensity VN of the vehicle is less than or equal to the predetermined value VNth than when the noise intensity VN is greater than the predetermined value VNth. Alternatively, for example, only one of the two processes may be executed.

For example, when the current value of the solenoid valve of the transmission 50 is used as the action variable as described in the Regarding Action Variable section above, the reward calculating process simply needs to include one of the three processes (a) to (c).

(a) A process that provides a greater reward when time required for the transmission to change the gear ratio is within a predetermined time than when the required time is exceeds the predetermined time.

(b) A process that provides a greater reward when the absolute value of the rate of change of the rotation speed of the transmission input shaft 52 is less than or equal to an input-side predetermined value than when the absolute value exceeds the input-side predetermined value.

(c) A process that provides a greater reward when the absolute value of the rate of change of the rotation speed of the transmission output shaft 54 is less than or equal to an output-side predetermined value than when the absolute value exceeds the output-side predetermined value.

The process (a) corresponds to the process that provides a greater reward when the acceleration response is high than when the acceleration response is low. The processes (b) and (c) correspond to the process that provides a greater reward when the vibration is small than when the vibration is large. In other words, the processes (b) and (c) correspond to the process that provides a greater reward when the state in the passenger compartment meets the standard than when the state does not meet the standard.

Also, when the torque or the output of the rotating electric machine is used as the action variable as described in the Regarding Action Variable section above, the reward calculating process may include the following processes: a process that provides a greater reward when the state of charge of the battery is within a predetermined range than when the state of charge is out of the predetermined range; and a process that provides a greater reward when the temperature of the battery is within a predetermined range than when the temperature is out of the predetermined range. Further, when the action variable includes the load torque of the compressor or the power consumption of the air conditioner as described in the Regarding Action Variable section above, the reward calculating process may include a process that provides a greater reward when the temperature in the passenger compartment is within a predetermined range than when the temperature is out of the predetermined range.

Regarding Method for Generating Vehicle Control Data

In the process of S24 in FIG. 4, an action is determined based on the action value function Q. Instead, all the actions that are possibly taken may be selected at the same probability.

Regarding Control Mapping Data

The control mapping data that inputs the state of the vehicle and outputs the value of the action variable that maximizes the expected return by associating the state of the vehicle with the value of the action variable that maximizes the expected return one-on-one is not limited to map data. For example, a function approximator may be used. This is achievable by, for example, using, as the control mapping data, a function approximator that indicates the average value obtained by the process of FIG. 9. That is, the average value μ output by the function approximator is regarded as the value of the action variable that maximizes the expected return. Instead of including the preference variable VT in the independent variable of a single function approximator, a different function approximator may be provided for each of the values of the preference variable VT.

Regarding Vehicle Control System

In the processes of FIG. 13, the processes of S96, S98 are all executed in the data analysis center 130. However, the present disclosure is not limited to this. For example, in the data analysis center 130, the process of S98 may be executed but the process of S96, which is the reward calculating process does not have to be executed. In this case, the calculation result og the reward may be transmitted to the data analysis center 130 in the process of S130 in the section (a) of FIG. 13.

In the example shown in FIG. 13, the process that determines an action based on the policy π (the process of S94) is executed by the vehicle. Instead, for example, the data obtained by the process of S22b may be transmitted from the vehicle VC1. The data analysis center 130 may determine the action a using the transmitted data and transmit the determined action to the vehicle VC1.

The vehicle control system does not necessarily include the controller 70 and the data analysis center 130. For example, the data analysis center 130 may be replaced with the mobile terminal of the user. Also, the vehicle control system may include the controller 70 and the data analysis center 130. This vis achieved by, for example, the portable terminal executing the process of S94 in the section (a) of FIG. 13.

Regarding Execution Device

The execution device is not limited to the device that includes the CPU 72 (112, 132) and the ROM 74 (114, 134) and executes software processing. For example, at least part of the processes executed by the software in the above-described embodiments may be executed by hardware circuits dedicated to executing these processes (such as ASIC). That is, the execution device may be modified as long as it has any one of the following configurations (a) to (c). (a) A configuration including a processor that executes all of the above-described processes according to programs and a program storage device such as a ROM (including a non-transitory computer readable memory medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and a plurality of dedicated hardware circuits may be provided.

Regarding Memory Device

In the above-described embodiments, the memory device storing the relationship defining data DR and the memory device (ROM 74, 114, 134) storing the learning program 74*b*, 114*a*, 134*a* and the control program 74*a* are separate from each other. However, the present disclosure is not limited to this.

Regarding Internal Combustion Engine

The internal combustion engine does not necessarily include, as the fuel injection valve, a port injection valve that injects fuel to the intake passage 12, but may include a direct injection valve that injects fuel into the combustion chamber 24. Further, the internal combustion engine may include both a port injection valve and a direct injection valve.

The internal combustion engine is not limited to a spark-ignition engine, but may be a compression ignition engine that uses, for example, light oil or the like.

Regarding Propelling Force Generator

The propelling force generator mounted on the vehicle is not limited to an internal combustion engine, but may include an internal combustion engine and a rotating electric machine like a hybrid vehicle. Alternatively, for example, the propelling force generator may include only a rotating electric machine like an electric vehicle or a fuel-cell vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle control data generation method, the generation method comprising:
  obtaining, by an execution device with relationship defining data stored in a memory device, a preference variable and a state of a vehicle that is based on a detection value of a sensor, the preference variable indicating a relative preference of a user for two or more requested elements, the relationship defining data defining a relationship between the state of the vehicle and an action variable related to an operation of an electronic device in the vehicle;
  operating, by the execution device with the relationship defining data stored in the memory device, the electronic device;
  providing, by the execution device with the relationship defining data stored in the memory device, based on the obtained state of the vehicle, a greater reward when a characteristic of the vehicle meets a standard than when the characteristic of the vehicle does not meet the standard; and
  updating, by the execution device with the relationship defining data stored in the memory device, the relationship defining data by inputting, to a predetermined update map, the obtained state of the vehicle, the value of the action variable used to operate the electronic device, and the reward corresponding to the operation of the electronic device, wherein
  the update map outputs the updated relationship defining data so as to increase an expected return for the reward in a case where the electronic device is operated in accordance with the relationship defining data,
  the two or more requested elements include at least two of three requested elements, the three requested elements including a requested element indicating a high acceleration response of the vehicle, a requested element indicating that at least one of vibration or noise of the vehicle is small, and a requested element indicating a high energy use efficiency, and
  the providing the reward includes changing a reward that is provided when a characteristic of the vehicle is a predetermined characteristic in a case where the value of the preference variable is a second value such that the changed reward differs from the reward that is provided when the characteristic of the vehicle is the predetermined characteristic in a case where the value of the preference variable is a first value.

2. The vehicle control data generation method according to claim 1, wherein
  the vehicle includes an internal combustion engine, and
  the two or more requested elements that indicate the relative preference depending on the preference variable include, instead of the at least two of the three requested elements, at least two requested elements of four requested elements, the four requested elements including a requested element indicating a low concentration of a predetermined component in exhaust gas of the internal combustion engine and the three requested elements.

3. The vehicle control data generation method according to claim 1, further comprising generating, by the execution device, based on the updated relationship defining data, control mapping data by associating the state of the vehicle with a value of the action variable that maximizes the expected return, wherein
  the state of the vehicle is input to the control mapping data, which outputs the value of the action variable that maximizes the expected return.

4. A vehicle controller, comprising a memory device and an execution device carrying out the vehicle control data generation method according to claim 1, wherein
  the operating the electronic device includes operating, based on the relationship defining data, the electronic device in accordance with a value of the action variable corresponding to the state of vehicle, and
  the obtaining the preference variable includes obtaining, as the preference variable, the relative preference of the user for the at least two requested elements.

5. A vehicle control system, comprising an execution device, a memory device and the vehicle controller according to claim 4, wherein
  the execution device includes a first execution device mounted on the vehicle and a second execution device that is an out-of-vehicle device,
  the first execution device is configured to execute at least the obtaining the state of the vehicle and the preference variable and the operating the electronic device, and
  the second execution device is configured to execute at least the updating the relationship defining data.

6. A vehicle controller according to claim 4, comprising a first execution device mounted on the vehicle and a second execution device that is an out-of-vehicle device, the first execution device is configured to execute at least the obtaining the state of the vehicle and the preference variable and the operating the electronic device.

7. A vehicle learning device, comprising the vehicle control system according to claim 5.

8. A vehicle control data generation device comprising an execution device and a memory device, wherein
with relationship defining data stored in the memory device, the execution device is configured to execute:
an obtaining process that obtains a preference variable and a state of a vehicle that is based on a detection value of a sensor, the preference variable indicating a relative preference of a user for two or more requested elements, the relationship defining data defining a relationship between the state of the vehicle and an action variable related to an operation of an electronic device in the vehicle;
an operation process that operates the electronic device;
a reward calculating process that provides based on the state of the vehicle obtained by the obtaining process, a greater reward when a characteristic of the vehicle meets a standard than when the characteristic of the vehicle does not meet the standard; and
an update process that updates the relationship defining data by inputting, to a predetermined update map, the state of the vehicle obtained by the obtaining process, the value of the action variable used to operate the electronic device, and the reward corresponding to the operation of the electronic device, wherein
the update map outputs the updated relationship defining data so as to increase an expected return for the reward in a case where the electronic device is operated in accordance with the relationship defining data,
the two or more requested elements include at least two of three requested elements, the three requested elements including a requested element indicating a high acceleration response of the vehicle, a requested element indicating that at least one of vibration or noise of the vehicle is small, and a requested element indicating a high energy use efficiency, and
the reward calculating process includes a changing process that changes a reward that is provided when a characteristic of the vehicle is a predetermined characteristic in a case where the value of the preference variable is a second value such that the changed reward differs from the reward that is provided when the characteristic of the vehicle is the predetermined characteristic in a case where the value of the preference variable is a first value.

9. A non-transitory computer readable memory medium that stores a program that causes an execution device to execute a vehicle control data generation process, the generation process comprising:
obtaining, by the execution device with relationship defining data stored in a memory device, a preference variable and a state of a vehicle that is based on a detection value of a sensor, the preference variable indicating a relative preference of a user for two or more requested elements, the relationship defining data defining a relationship between the state of the vehicle and an action variable related to an operation of an electronic device in the vehicle;
operating, by the execution device with the relationship defining data stored in the memory device, the electronic device;
providing, by the execution device with the relationship defining data stored in the memory device, based on the obtained state of the vehicle, a greater reward when a characteristic of the vehicle meets a standard than when the characteristic of the vehicle does not meet the standard; and
updating, by the execution device with the relationship defining data stored in the memory device, the relationship defining data by inputting, to a predetermined update map, the obtained state of the vehicle, the value of the action variable used to operate the electronic device, and the reward corresponding to the operation of the electronic device, wherein
the update map outputs the updated relationship defining data so as to increase an expected return for the reward in a case where the electronic device is operated in accordance with the relationship defining data,
the two or more requested elements include at least two of three requested elements, the three requested elements including a requested element indicating a high acceleration response of the vehicle, a requested element indicating that at least one of vibration or noise of the vehicle is small, and a requested element indicating a high energy use efficiency, and
the providing the reward includes changing a reward that is provided when a characteristic of the vehicle is a predetermined characteristic in a case where the value of the preference variable is a second value such that the changed reward differs from the reward that is provided when the characteristic of the vehicle is the predetermined characteristic in a case where the value of the preference variable is a first value.

* * * * *